(12) United States Patent
Akutsu et al.

(10) Patent No.: US 9,047,220 B2
(45) Date of Patent: Jun. 2, 2015

(54) STORAGE SYSTEM AND DATA MANAGEMENT METHOD

(75) Inventors: Hiroaki Akutsu, Yokohama (JP); Junji Ogawa, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 180 days.

(21) Appl. No.: 13/696,370

(22) PCT Filed: Jul. 23, 2012

(86) PCT No.: PCT/JP2012/004669
§ 371 (c)(1),
(2), (4) Date: Nov. 6, 2012

(87) PCT Pub. No.: WO2014/016860
PCT Pub. Date: Jan. 30, 2014

(65) Prior Publication Data
US 2014/0025990 A1    Jan. 23, 2014

(51) Int. Cl.
*G06F 11/00* (2006.01)
*G06F 11/10* (2006.01)

(52) U.S. Cl.
CPC .................................. *G06F 11/1092* (2013.01)

(58) Field of Classification Search
USPC ........................................................ 714/6.24
See application file for complete search history.

(56) References Cited

U.S. PATENT DOCUMENTS

| | | | |
|---|---|---|---|
| 6,098,191 A | 8/2000 | Yamamoto et al. | |
| 6,516,425 B1 * | 2/2003 | Belhadj et al. | 714/6.12 |
| 7,073,024 B1 * | 7/2006 | Chilton | 711/114 |
| 7,246,301 B2 * | 7/2007 | Chawla | 714/764 |
| 2004/0255223 A1 * | 12/2004 | Chawla | 714/763 |
| 2009/0013213 A1 * | 1/2009 | Kalman et al. | 714/20 |
| 2009/0132851 A1 * | 5/2009 | Pruthi | 714/6 |
| 2010/0107003 A1 | 4/2010 | Kawaguchi | |
| 2011/0197023 A1 * | 8/2011 | Iwamitsu et al. | 711/114 |
| 2012/0131270 A1 | 5/2012 | Hemmi | |
| 2013/0326140 A1 * | 12/2013 | Iwamitsu et al. | 711/114 |

FOREIGN PATENT DOCUMENTS

| | | |
|---|---|---|
| EP | 2 365 439 A1 | 9/2011 |
| JP | 9-231015 A | 9/1997 |
| JP | 2008-191966 A | 8/2008 |

OTHER PUBLICATIONS

International Search Report and Written Opinion on application PCT/JP2012/004669 mailed Dec. 19, 2012; 12 pages.

* cited by examiner

*Primary Examiner* — Kamini Patel
(74) *Attorney, Agent, or Firm* — Foley & Lardner LLP

(57) ABSTRACT

Storage system comprises a second storage apparatus, which is coupled to multiple first storage apparatuses and is of a different type from the first storage apparatuses, and a first control device, which exists either inside or outside of the second storage apparatus. Row of stripes comprising multiple data elements obtained by segmenting a prescribed data unit, and a redundancy code for rebuilding the data elements, is distributively stored in multiple first storage apparatuses, which are more numerous than the total number of stripe data elements, which are either the data elements or redundancy code, in the row of stripes. The row of stripes is configured to enable the rebuilding of the stripe data elements even when a failure has occurred in up to a prescribed allowable number, which is two or more, of the first storage apparatuses storing the stripe data elements of the relevant row of stripes.

15 Claims, 37 Drawing Sheets

Page mapping table                                          210

| Virtual volume number | Logical page number | Pool number | Virtual pool space number | Physical page number |
|---|---|---|---|---|
| 1 | 1 | 0 | 2 | 0 |
|   | 22 | 0 | 2 | 1 |
| 12 | 1000 | 1 | 3 | 0 |
|   | 1003 | 1 | 3 | 1 |

Fig. 7

Parcel mapping table 220

| Virtual pool space number (221) | Extent # (222) | Drive offset # (223) | Physical drive # (224) | Physical parcel # (225) | Parcel status (226) |
|---|---|---|---|---|---|
| 2 | 0 | 0 | 3 | 1 | |
| | | 1 | 6 | 0 | |
| | | 2 | 2 | 2 | |
| | | 3 | 1 | 1 | Rebuild required |
| 3 | 10 | 0 | 16 | 0 | |
| | | 1 | 8 | 1 | |
| | | 2 | 15 | 2 | |
| | | 3 | 9 | 0 | |

Fig. 8

Drive status table 230

| Virtual pool space number (231) | Physical drive number (232) | Status (233) |
|---|---|---|
| 2 | 0 | Normal |
| | 1 | Abnormal (R/W not possible) |
| | ... | ... |
| | 7 | Normal |
| 3 | 8 | Normal |
| | 9 | Normal |
| | ... | ... |
| | 15 | Normal |

Cache management table 240

| Virtual volume number 241 | Volume slot number 242 | Cache slot number 243 | Destage inhibit flag 244 | Dirty bitmap 245 |
|---|---|---|---|---|
| 2 | 0 | 5(Data), 7(Parity) | OFF | 101000101... |
|  | 1 | - | - | - |
|  | ... | ... | ... | ... |
|  | 999 | 6(Data), 2(Parity) | OFF | 010110010... |
| 3 | 0 | 4(Data), 3(Parity) | OFF | 001000001... |
|  | 1 | - | - | - |
|  | ... | ... | ... | ... |
|  | 499 | - | - | - |

Fig. 19

Galois computation coefficient table  250

| RAID type | Coefficient | Value |
|---|---|---|
| 6D2P | $A^1$ | 01101110101... |
| | $A^2$ | 10101110101... |
| | $A^3$ | 10101011101... |
| | $A^4$ | 01001100100... |
| | $A^5$ | 01110100101... |
| | $A^6$ | 11100101011... |
| | $A^7$ | 01010101101... |
| | $A^8$ | 10010100100... |
| 14D2P | $A^1$ | 01101110101... |
| | $A^2$ | 10101110101... |
| | $A^3$ | 10101011101... |
| | $A^4$ | 01001100100... |
| | $A^5$ | 01110100101... |
| | $A^6$ | 11100101011... |
| | $A^7$ | 01010101101... |
| | $A^8$ | 01001100100... |
| | $A^9$ | 01110100101... |
| | $A^{10}$ | 11100101011... |
| | $A^{11}$ | 10101110101... |
| | $A^{12}$ | 01001100100... |
| | $A^{13}$ | 01110100101... |
| | $A^{14}$ | 11100101011... |
| | $A^{14}$ | 01010101101... |
| | $A^{15}$ | 01101110101... |
| | $A^{16}$ | 10101110101... |

251 — RAID type
252 — Coefficient
253 — Value

Fig. 20

| # | Category | Loss category | Lost data type | Method for creating partially rebuilt data |
|---|----------|---------------|----------------|--------------------------------------------|
| 1 | RAID5 | Single failure | Dm | Send one type of data($P+\Sigma Di$) |
| 2 | | | P | Send one type of data($\Sigma Di$) |
| 3 | RAID6 | Single failure | Dm | Send one type of data($P+\Sigma Di$) |
| 4 | | | P | Send one type of data($\Sigma Di$) |
| 5 | | | Q | Send one type of data($\Sigma A^i \times Di$) |
| 6 | | Double failure | Dm, Dn | Send two types of data ($P+\Sigma Di$, $Q+\Sigma A^i \times Di$) <Remark: Rebuild method> $Dm = A^s \cdot QQ + A^{s+m} \cdot PP$ $Dn = A^s \cdot QQ + A^{s+n} \cdot PP$ ($PP = P + \Sigma Di$) ($QQ = Q + \Sigma Ai \times Di$) |
| 7 | | | Dm, P | Send two types of data ($\Sigma Di$, $Q+\Sigma A^i \times Di$) |
| 8 | | | Dm, Q | Send two types of data ($P+\Sigma Di$, $\Sigma A^i \times Di$) |
| 9 | | | P, Q | Send two types of data ($\Sigma Di$, $\Sigma A^i \times Di$) |

Fig. 25

Parcel mapping table

| Virtual pool space number | Extent # | Drive offset # | Physical drive # | Physical parcel # | Parcel status | Rebuild data type |
|---|---|---|---|---|---|---|
| 2 | 0 | 0 | 3 | 1 | | |
| | | 1 | 6 | 0 | | |
| | | 2 | 2 | 2 | | |
| | | 3 | 1 | 1 | Rebuild required | |
| | | 3 | 2 | 4 | Partially rebuilt data stored | D1+P |
| 3 | 10 | 0 | 16 | 0 | | |
| | | 1 | 8 | 1 | | |
| | | 2 | 15 | 2 | | |
| | | 3 | 9 | 0 | | |

Fig. 31

Rebuilt bitmap  270

| Physical drive # (271) | Physical parcel # (272) | Rebuild bitmap (273) |
|---|---|---|
| 1 | 0 | 011010011… |
|  | 1 | 011010011… |
|  | 2 | 111110011… |

Fig. 32

Parcel mapping table  280

| Virtual pool space number (281) | Extent # (282) | Drive offset # (283) | Physical drive # (284) | Physical parcel # (285) | Parcel status (286) |
|---|---|---|---|---|---|
| 2 | 0 | 0 | 3 | 1 |  |
|  |  | 1 | 6 | 0 |  |
|  |  | 2 | 2 | 2 |  |
|  |  | 3 | 1 | 1 | Rebuild required |
|  |  | 3 | 2 | 4 | Rebuilt data stored |
| 3 | 10 | 0 | 16 | 0 |  |
|  |  | 1 | 8 | 1 |  |
|  |  | 2 | 15 | 2 |  |
|  |  | 3 | 9 | 0 |  |

Fig. 33

Drive status table 290

| Virtual pool space number 291 | Physical drive number 292 | Number of errors (Read) 293 | Number of errors (Write) 294 | Status 295 |
|---|---|---|---|---|
| 2 | 0 | 0 | 0 | Normal |
| | 1 | 333 | 333 | Abnormal (Inaccessible) |
| | ... | ... | ... | ... |
| | 7 | 0 | 0 | Normal |
| 3 | 8 | 0 | 132 | Abnormal (W not possible) |
| | 9 | 0 | 120 | Abnormal (W not possible) |
| | ... | ... | ... | ... |
| | 15 | 0 | 0 | Normal |

Fig. 38

Stripe table

| Physical drive # | Physical parcel # | Virtual pool space number | Extent # | Drive offset # | Parcel status |
|---|---|---|---|---|---|
| 1 | 0 | 2 | 0 | 0 | Rebuild required |
| 1 | 1 | 2 | 0 | 1 | Rebuild required |
| 1 | 2 | 2 | 0 | 2 | Rebuild required |
| 1 | 3 | 2 | 0 | 3 | Rebuild required |
| 2 | 0 | 2 | 2 | 0 | |
| 2 | 1 | 2 | 2 | 1 | |
| 2 | 2 | 2 | 2 | 2 | |
| 2 | 3 | 2 | 2 | 3 | |

Fig. 41

STORAGE SYSTEM AND DATA MANAGEMENT METHOD

TECHNICAL FIELD

The present invention relates to a storage system, which has multiple storage apparatuses that configure a Redundant Array of Independent Disks (RAID) group for the normal data rebuild process, and technology for managing data in a RAID group.

BACKGROUND ART

Heretofore, multiple storage apparatuses have been configured into a RAID (Redundant Array of Independent Disks) group in a storage system, and a logical volume created based on the RAID group has been provided to a higher-level apparatus (for example, a host computer).

As a RAID-related technology, Patent Literature 1 discloses a so-called distributed RAID, that is, a technology for managing a row of stripes comprising normal data and redundant data for restoring the normal data by distributing these stripes among multiple storage apparatuses, which provide a storage area to a capacity pool.

Patent Literature 2 discloses a technology for alleviating the load on a disk controller by implementing a data copy and a correction copy inside a parity group coupled within the same loop on the FM controller side.

Patent Literature 3 discloses a technology for a disk device to receive information needed to update a parity from a control apparatus and to create a parity record based on this information.

CITATION LIST

Patent Literature

PTL 1: US Patent Application Publication No. 2010/0107003 (Specification)
PTL 2: Japanese Patent Application Publication No. 2008-191966
PTL 3: Japanese Patent Application Publication No. H9-231015

SUMMARY OF INVENTION

Technical Problem

In a case where a failure has occurred in any storage apparatus comprising a RAID group, which stores redundant data, the redundant data and the like is used to restore (rebuild) data stored in the storage apparatus in which the failure occurred. The problem is that the capacity of storage apparatuses has been increasing in recent years, making the time required for a rebuild much longer.

Solution to Problem

A storage system comprises a second storage apparatus, which is coupled to multiple first storage apparatuses and is of a different type from the first storage apparatuses, and a first control device, which is located either inside or outside of the second storage apparatus. A row of stripes comprising multiple data elements obtained by segmenting a prescribed data unit, and a redundancy code for rebuilding a data element, is distributively stored in multiple first storage apparatuses, which are more numerous than the total number of stripe data elements, which are either the data elements or the redundancy code, in the row of stripes. The row of stripes is configured to enable the rebuilding of the stripe data elements even when a failure has occurred in up to a prescribed allowable number, which is two or more, of the first storage apparatuses storing the stripe data elements of the relevant row of stripes. The first control device detects, from among multiple rows of stripes, a first row of stripes in which either the prescribed allowable number or a number approximating the prescribed allowable number of first storage apparatuses from among the multiple first storage apparatuses storing the stripe data elements of the relevant row of stripes have failed, and rebuilds the stripe data elements of the detected first row of stripes in the first storage apparatus on a priority basis.

Furthermore, the "second storage apparatus, which is of a different type from the first storage apparatus", for example, signifies that the configurations of the first storage apparatus and the second storage apparatus differ. Specifically, for example, the multiple first storage apparatuses may each be storage media, and the second storage apparatus may be an apparatus for controlling these multiple storage media.

BRIEF DESCRIPTION OF DRAWINGS

FIG. 7 is a diagram showing an example of a parcel mapping table related to Example 1.
FIG. 8 is a diagram showing an example of a drive status table related to Example 1.
FIG. 19 is a diagram showing an example of a Galois computation coefficient table related to Example 2.
FIG. 20 is a diagram illustrating a method for creating rebuild data in the RAID.

FIG. 25 is a diagram showing an example of a parcel mapping table related to Example 6.

FIG. 31 is a diagram showing an example of a rebuilt bitmap table related to Example 7.

FIG. 32 is a diagram showing an example of a parcel mapping table related to Example 7.

FIG. 33 is a diagram showing an example of a drive status table related to Example 7.

FIG. 38 is a diagram showing an example of a stripe table related to Example 8.

FIG. 41 is a diagram illustrating warning parcels position in a data placement method same as FIG. 40 related to Example 8.

DESCRIPTION OF EMBODIMENTS

Figure 1:
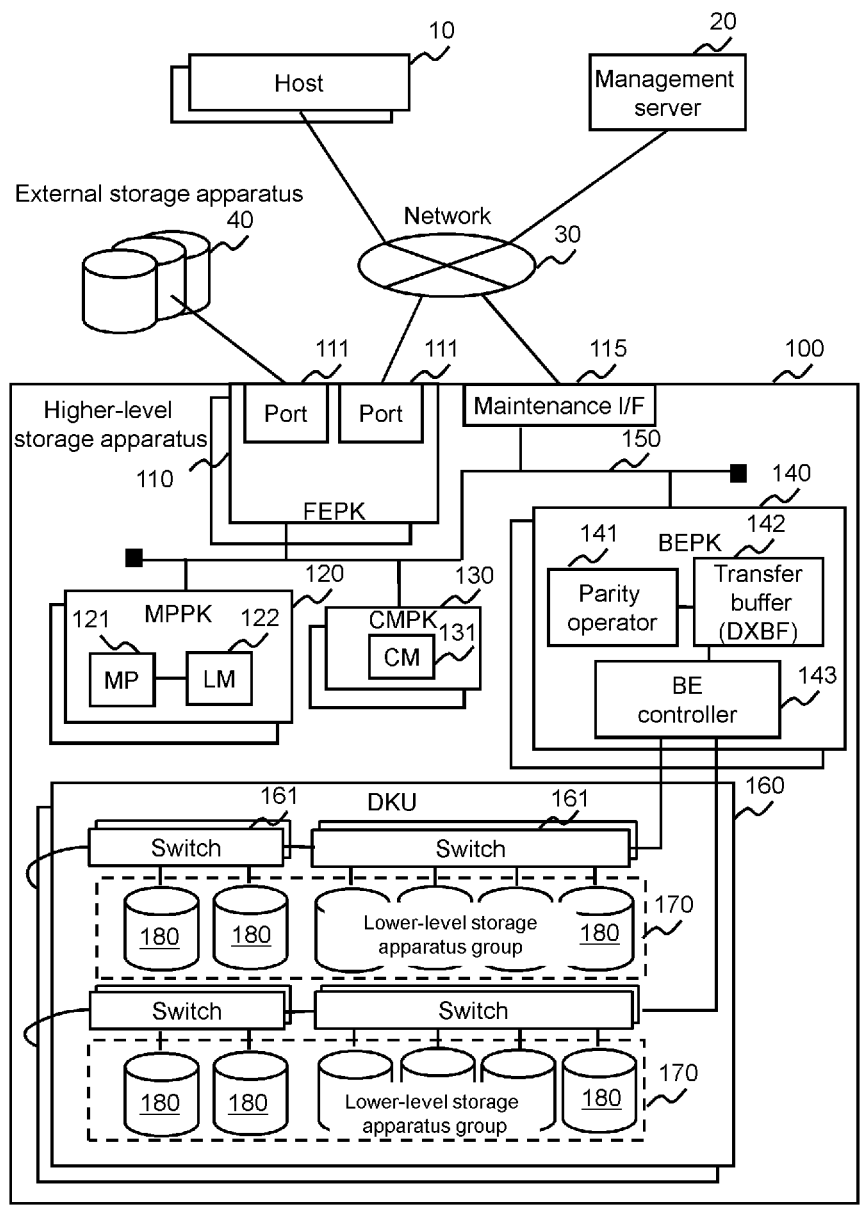
FIG. 1 is a hardware block diagram of a computer system related to Example 1.

A number of examples will be explained by referring to the drawings. The examples explained below do not limit the invention pertaining to the claims, and not all of the elements or combinations thereof explained in the examples are required for the solution of the invention.

Furthermore, in the following explanation, various types of information may be explained using the expression "aaa table", but the various information may also be expressed using a data structure other than a table. To show that the various information is not dependent on the data structure, "aaa table" can be called "aaa information".

Also, in the following explanation, there may be cases where processing is explained having a "program" as the doer of the action, but since the stipulated processing is performed in accordance with a program being executed by a processor (for example, a CPU (Central Processing Unit)) while using a storage resource (for example, a memory) and/or a communication interface device (for example, a port) as needed, the processor may be used as the doer of the processing. A process, which is explained using the program as the doer of the action, may be regarded as a process performed by the processor or a computer comprising this processor (for example, a management computer, a host computer, or a storage apparatus). Furthermore, a controller may be the processor itself, or may comprise a hardware circuit, which carries out either part or all of the processing performed by the controller. A program may be installed in respective controllers from a program source. The program source, for example, may be either a program delivery server or a storage medium.

Example 1

An overview of a computer system comprising a storage system related to Example 1 will be explained.

A storage system, for example, comprises a higher-level storage apparatus (a second storage apparatus) 100 shown in FIG. 1. The storage system may comprise an external storage apparatus 40, which is an example of a first storage apparatus. Multiple lower-level storage apparatuses 180, which are examples of first storage apparatuses, are provided in a DKU 160 of the higher-level storage apparatus 100. A capacity pool (hereinafter referred to as pool), which comprises the storage areas of multiple lower-level storage apparatuses 180, is managed in the higher-level storage apparatus 100. A RAID group is configured in the higher-level storage apparatus 100 using the pool area. That is, the RAID group comprises the multiple lower-level storage apparatuses 180, which make up the pool area.

The RAID group storage area comprises multiple rows of sub-storage areas. Each row of sub-storage areas spans the multiple storage apparatuses (lower-level storage apparatuses and/or the external storage apparatus) comprising the RAID group, and comprises multiple sub-storage areas corresponding to multiple storage apparatuses. A single sub-storage area is called a "stripe" here, and a single row comprising multiple stripes is called a "row of stripes". The RAID group storage area comprises multiple rows of stripes.

There are a number of levels for RAID (hereinafter referred to as a "RAID level").

For example, in a RAID5, write-target data specified from a host computer corresponding to RAID5 is partitioned into data of a prescribed size (hereinafter referred to as a "data unit" for the sake of convenience), each data unit is partitioned into multiple data elements, and the multiple data elements are written to multiple stripes. In RAID5, redundant information (hereinafter "redundancy code"), which is called "parity", is created for each data unit in order to rebuild a data element, which is no longer able to be read from a storage apparatus as a result of a failure having occurred in this storage apparatus, and this redundancy code is written to a stripe in the same row of stripes. For example, in a case where a RAID group comprises four storage apparatuses, three data elements comprising the data unit are written to three stripes corresponding to three of these storage apparatuses, and the redundancy code is written to the stripe corresponding to the remaining storage apparatus. Hereinbelow, in a case where no distinction is made between a data element and a redundancy code, both may be referred to as a stripe data element.

In addition, in a RAID6, in a case where it becomes impossible to read two data elements of the multiple data elements comprising a data unit because failures have occurred in two storage apparatuses of the multiple storage apparatuses comprising the RAID group, two types of redundancy codes (called a P-parity and a Q-parity) are created for each data unit so as to enable these two data elements to be rebuilt, and both redundancy codes are written to stripes of the same row of stripes.

RAID levels other than those explained hereinabove also exist (for example, RAID 1 through 4). In addition, as technologies for making data redundant, there is also triple mirroring (Triplication) and a triple parity technology, which uses three parities. There is also a variety of techniques for creating a redundancy code, such as Reed-Solomon codes using Galois field arithmetic, and the EVEN-ODD technique. In the example of the present invention, RAID5 and RAID6 will mainly be explained, but the present invention is not limited thereto, and can be applied by substituting for the above-described methods.

In a case where any lower-level storage apparatus 180 of the lower-level storage apparatuses 180 fails, for example, the higher-level storage apparatus 100 rebuilds the data element stored in the failed lower-level storage apparatus 180 in accordance with either a first process or a second process shown hereinbelow.

As the first process, a microprocessor (MP) 121 acquires data (for example, another data element and parity) required for rebuilding the data element stored in the failed lower-level storage apparatus 180 from the multiple lower-level storage apparatuses 180 storing this data, stores this acquired data in a transfer buffer 142 of an interface device (for example, a BEPK 140), uses a parity operator 141 of the BEPK 140 to rebuild the data element based on the data in the transfer buffer 142, and stores the relevant data element in a prescribed lower-level storage apparatus 180. According to the first process, the data for rebuilding the data element need not be stored in a CM 131, thereby making it possible to reduce the load on the CM 131 and an internal network 150 of the higher-level storage apparatus 100.

As the second process, the MP 121 collects data (for example, another data element and/or parity), which is required for rebuilding a data element stored in a failed storage apparatus 180 of any to the lower-level storage apparatuses 180 of a path group, and which is stored in a lower-level storage apparatus 180 belonging to the relevant path group, and based on the collected data, creates partially rebuilt data as an example of rebuild data by performing an operation for rebuilding the data element, acquires the relevant partially rebuilt data, and stores this data in the transfer buffer 142. The MP 121 also sends the partially rebuilt data stored in the transfer buffer 142 to any lower-level storage apparatus 180 of another path group, has the lost data element rebuilt by this lower-level storage apparatus 180 based on the partially rebuilt data, and stores the rebuilt data element in any lower-level storage apparatus 180. According to the second process, the data for rebuilding the data element need not be stored in the CM 131, thereby making it possible to reduce the load on the CM 131 and the internal network of the higher-level storage apparatus 100. Also, since the partially rebuilt data is created in the lower-level storage apparatus 180 by using another data element and/or parity, and sent to the BEPK 140, it is possible to reduce the amount of data sent from the lower-level storage apparatus 180 to the BEPK 140. Also, the higher-level storage apparatus 100 rebuilds the data without using the parity operator 141, thereby making it possible to alleviate the load on the parity operator 141.

A computer system comprising a storage system related to Example 1 will be explained first.

FIG. 1 is a hardware block diagram of a computer system related to Example 1.

The computer system comprises one or more host computers (hereinafter called host) 10, a management server 20, and a higher-level storage apparatus 100. The host computer 10, the management server 20, and the higher-level storage apparatus 100 are coupled via a network 30. The network 30 may be a local area network or a wide area network. Also, one or more external storage apparatuses 40 may be coupled to the higher-level storage apparatus 100. The external storage apparatus 40 comprises one or more storage devices. The storage device is a nonvolatile storage medium, for example, a magnetic disk, a flash memory, or another semiconductor memory.

The host 10, for example, is a computer for executing an application, and reads data used in the application from the higher-level storage apparatus 100 and writes data created by the application to the higher-level storage apparatus 100.

The management server 20 is used by an administrator to execute a management process for managing the computer system. The management server 20, in accordance with an input device operation by the administrator, receives a setting for a type of data rebuild process to be executed when rebuilding data, and configures the higher-level storage apparatus 100 to execute the received data rebuild process.

The higher-level storage apparatus 100 comprises one or more front-end packages (FEPK) 110, a maintenance interface (maintenance I/F) 115, one or more microprocessor packages (MPPK) 120, one or more cache memory packages (CMPK) 130, one or more backend packages (BEPK) 140, an internal network 150, and one or more disk units (DKU) 160. The FEPK 110, the maintenance I/F 115, the MPPK 120, the CMPK 130, and the BEPK 140 are coupled via the internal network 150. The BEPK 140 is coupled to the DKU 160 via multiple system paths.

The FEPK 110 is one example of an interface device, and comprises one or more ports 111. The port 111 couples the higher-level storage apparatus 100 to various apparatuses via the network 30 and so forth. The maintenance I/F 115 is for coupling the higher-level storage apparatus 100 to the management server 20.

The MPPK 120 comprises a microprocessor (MP) 121 as one example of a first control device, and a local memory (LM) 122. The LM 122 stores various programs and various types of information. The MP 121 executes each processing by implementing various programs stored in the LM 122. The MP 121 sends various commands to a lower-level storage apparatus 180 of the DKU 160 via the BEPK 140. The MP 121 also sends various commands to the external storage apparatus 40 via the FEPK 110.

The commands, which the MP 121 sends to the lower-level storage apparatus 180 via the BEPK 140 and sends to the external storage apparatus 40 via the FEPK 110, will be explained here. In a case where the lower-level storage apparatus 180 supports a SCSI command, the following commands can be realized by using the vendor-unique field of the SCSI command.

<Primitive Command>

A primitive command is for executing a basic function on a storage apparatus (for example, a lower-level storage apparatus 180).

(1) Data Copy Command

A data copy command is a command to a storage apparatus (for example, a lower-level storage apparatus 180) for copying data from an area of a transfer-source device (for example, a lower-level storage apparatus 180) to an area of a transfer-destination device (for example, another lower-level storage apparatus 180). This command is sent to the transfer-destination device. Upon receiving this command, the transfer-destination device copies the data to the transfer-source device. Specifically, for example, there is a method by which the transfer-source device recognizes the transfer-destination device as the SCSI initiator device via the switch 161, issues an SCSI write command and copies the data. Another data transfer command may also be used. The same data transfer may also be implemented in accordance with the switch 161 recognizing the lower-level storage apparatus as the initiator device, and the upper-level storage apparatus issuing the data copy command. Thus, a data copy can be executed without going through the BE controller 143 like this.

The arguments of the data copy command are a transfer-source device #, a transfer-source LBA # (or transfer-source buffer #), a transfer-destination LBA # (or transfer-destination buffer #), a TL #, and a buffer mode. Each argument is as follows.

The transfer-source device # is a number for identifying the transfer-source storage apparatus, and, for example, is a SCSI ID or LUN (Logical Unit Number).

The transfer-source LBA # is the number of a transfer-source sub-block. The transfer-source buffer # is the number of a buffer in the transfer-source lower-level storage apparatus 180. In a case where the buffer mode for the transfer source shown below is OFF, the transfer-source LBA # is configured as the argument, and in a case where the buffer mode for the transfer source in ON, the transfer-source buffer # is configured as the argument.

The transfer-destination LBA # is the number of a transfer-destination sub-block. The transfer-destination buffer # is the number of a buffer in the transfer-destination lower-level storage apparatus. In a case where the buffer mode for the transfer destination is OFF, the transfer-destination LBA # is configured as the argument, and in a case where the buffer mode for the transfer destination in ON, the transfer-destination buffer # is configured as the argument.

The TL # is the number of sub-blocks to be transferred.

The buffer mode comprises ON/OFF for showing whether or not a buffer area of the storage apparatus (for example, the lower-level storage apparatus 180) is specified as the transfer source, and ON/OFF for showing whether or not a buffer area of the storage apparatus is specified as the transfer destination.

The contents of multiple transfers (for example, multiple transfer-source storage apparatuses and transfer-source LBA #s) may be included in a single data copy command. The number of commands issued can be reduced in accordance with doing this.

(2) Parity Operation Command

A parity operation command is a command to a storage apparatus (for example, a lower-level storage apparatus 180) for executing a parity operation (for example, an exclusive OR (XOR) in the case of RAID5) on operation-source area data and operation-destination area data, and for executing a process for writing the result of the operation to the operation-destination area. This command is sent to the storage apparatus, which performs the operation.

The arguments of the parity operation command are an operation-source area LBA # (or operation-source buffer #), an operation-destination area LBA # (or operation-destination buffer #), a TL #, and a buffer mode. Each argument is as follows.

The operation-source area LBA # is the number of an operation-source sub-block in which data used in the operation of the storage apparatus, which received the command, is stored. The operation-source buffer # is the number of a buffer in the operation-source in which data used in the operation of the storage apparatus, which received the command, is stored. In a case where the buffer mode for the operation source is OFF, the operation-source area LBA # is configured as the argument, and in a case where the buffer mode for the operation source in ON, the operation-source buffer # is configured as the argument.

The operation-destination area LBA # is the number of an operation-destination sub-block for storing the result of the operation of the storage apparatus, which received the command. The operation-destination buffer # is the number of the buffer for storing the result of the operation of the storage apparatus, which received the command. In a case where the buffer mode for the operation destination is OFF, the operation-destination area LBA # is configured as the argument, and in a case where the buffer mode for the operation destination in ON, the operation-destination buffer # is configured as the argument.

The TL # is the number of sub-blocks in which the data used in the operation is included.

The buffer mode comprises ON/OFF for showing whether or not a buffer area of the storage apparatus is specified as the operation source, and ON/OFF for showing whether or not a buffer area of the storage apparatus is specified as the operation destination.

The contents of multiple operations (for example, multiple operation-source area LBAs) may be included in a single parity operation command. The number of commands issued can be reduced in accordance with doing this.

(3) Buffer Reserve/Release Command

A buffer reserve/release command is a command to a storage apparatus (for example, a lower-level storage apparatus 180) for reserving an area of the memory of the storage apparatus as a buffer, and for releasing a reserved buffer.

The arguments of the buffer reserve/release command are reserve and release. Each argument is a follows.

Reserve is configured when reserving a buffer. There is no need for configuring a parameter. The buffer number of a reserved buffer is included in a response from the storage apparatus with respect to the buffer reserve/release command, which was configured for reserving.

Release is configured when releasing a buffer. In the case of this argument, the number of the buffer to be released, and the release size (for example, the number of sub-blocks) must be configured.

(4) Buffer Read Command

A buffer read command is for reading data in a buffer of a storage apparatus (for example, a lower-level storage apparatus 180) to the transfer buffer 142 of the higher-level storage apparatus 100. That is, the buffer read command is a command to a storage apparatus for transferring and storing data, which is in the storage apparatus buffer, in the transfer buffer 142 of the higher-level storage apparatus 100.

The argument of the buffer read command is a buffer number. The buffer number is the number of the buffer of the storage apparatus targeted for the read.

(5) Buffer Write Command

A buffer write command is for writing data, which is in the transfer buffer 142 of the higher-level storage apparatus 100, to a buffer of a storage apparatus (for example, a lower-level storage apparatus 180). That is, the buffer write command is for storing data, which has been stored in the transfer buffer 142 of the higher-level storage apparatus, in a storage apparatus buffer.

The argument of the buffer write command is a buffer number. The buffer number is the number of the buffer of the storage apparatus targeted for the write.

<High-Level Command>

A high-level command allows a storage apparatus (for example, a lower-level storage apparatus 180) to execute a process, which combines basic command functions. The high-level command makes it possible to lower the number of commands sent when having a storage apparatus execute a series of processes, and to reduce the overhead of MP 121 processing.

(6) Parity-Rebuild Read Command

A parity-rebuild read command is for causing a storage apparatus (for example, a lower-level storage apparatus 180) to acquire a data element and/or parity needed for rebuilding a prescribed data element from multiple storage apparatuses in the same path group, to execute an operation (for example, an exclusive OR) for rebuilding the data element and/or parity, and to transfer the result of this operation to the transfer buffer 142 of the higher-level storage apparatus 100, which is the initiator. It is preferable that this command is transferred to a storage apparatus, which is configured in any of transfer-source devices #[1] through [N], which will be explained further below. When the command is transferred to a storage apparatus configured in any of transfer-source devices #[1] through [N], it is possible to lower the number of times that data is transferred between storage apparatuses, and to enhance processing efficiency.

The arguments of the parity-rebuild read command are a transfer-source device #[1], a transfer-source LBA #[1], . . . , a transfer-source device #[N], a transfer-source LBA # [N], and a TL #. Here, N is an arbitrary integer. Each argument is a follows.

The transfer-source devices #[1] through [N] are numbers for identifying respective transfer-source storage apparatuses, and, for example, are either SCSI IDs or LUNs (Logical Unit Numbers). Storage apparatuses, which belong to the same path group, can be configured in a single command as transfer-source devices #[1] through [N].

The transfer-source LBAs #[1] through [N] are numbers of sub-blocks in the respective transfer sources.

The TL # is the number of sub-blocks to be transferred.

(7) Parity-Rebuild Write Command

A parity-rebuild write command is for causing a storage apparatus (for example, a lower-level storage apparatus 180) to acquire a data element and/or parity needed for rebuilding a prescribed data element from multiple storage apparatuses in the same path group, to create a first operation result by executing an operation (for example, an exclusive OR) for rebuilding the data element and/or parity, and in addition, to acquire one or more operation results stored in the transfer buffer 142 of the higher-level storage apparatus 100, which is the initiator, to create a second operation result by executing an operation (for example, an exclusive OR) for rebuilding the prescribed data element based on the relevant operation result, and to rebuild the prescribed data element by executing a prescribed operation (for example, an exclusive OR) on the first operation result and the second operation result. The sequence of the operations for rebuilding the prescribed data element is not limited to that given above, and the operations may be executed in an arbitrary sequence, the point being that operations for rebuilding the data element be executed. This command may be transferred to a storage apparatus, which is configured in any of transfer-source devices #[1] through [N], which will be explained further below. When the command is transferred to a storage apparatus configured in any of transfer-source devices #[1] through [N], it is possible to lower the number of times that data is transferred between storage apparatuses, enabling the enhancement of processing efficiency.

The arguments of the parity-rebuild write command are a transfer-destination device #, a transfer-destination LBA #, a transfer-source device #[1], a transfer-source LBA #[1], . . . , a transfer-source device #[N], a transfer-source LBA #[N], a TL #, and a number of pieces of write data. Each argument is a follows.

The transfer-destination device # is a number for identifying a transfer-destination storage apparatus for storing the rebuilt data element, and, for example, is either an SCSI ID or a LUN (Logical Unit Number). A storage apparatus, which belongs to the same path group as the storage apparatuses configured as transfer-source devices #[1] through [N], is able to be specified as a transfer-destination storage apparatus.

The transfer-destination LBA # is the number of sub-blocks of the transfer destination.

The transfer-source devices #[1] through [N] are numbers for identifying respective transfer-source storage apparatuses, and, for example, are either SCSI IDs or LUNs (Logical Unit Numbers). Storage apparatuses, which belong to the same path group, are able to be configured in a single command as transfer-source devices #[1] through [N].

The transfer-source LBAs #[1] through [N] are numbers of sub-blocks in the respective transfer sources.

The TL # is the number of sub-blocks to be transferred from the storage apparatus corresponding to the transfer-source device number.

The number of pieces of write data is the number of operation results fetched from the transfer buffer 142 and transferred to the command-destination storage apparatus. More specifically, this represents the number of operation results based on a path group stored in the higher-level storage apparatus 100.

The CMPK 130 comprises a cache memory (CM) 131. The CM 131 temporarily stores data (write data) written to a lower-level storage apparatus 180 from the host 10, and data (read data) read from the lower-level storage apparatus 180.

The BEPK 140 comprises a parity operator 141 as an example of a second control device, a transfer buffer (DXBF) 142, and a backend controller (BE controller) 143.

The parity operator 141, for example, is a small processor, and when a failure occurs in the lower-level storage apparatus 180, creates the redundancy code (hereinafter, parity) for rebuilding a data element no longer able to be read as a result of this failure. The parity operator 141, for example, creates a P-parity for a data unit of a RAID group configured as RAID5 by computing the exclusive OR of multiple data elements comprising the data unit. The parity operator 141 also creates a Q-parity for a data unit of a RAID group configured as RAID6 by computing the exclusive OR of respective data after multiplying a prescribed coefficient by the multiple data elements comprising the data unit. The parity operator 141 also performs a rebuild process for rebuilding any data element in the data unit based on one or more stripe data elements (a data element and/or parity) of the data unit. In addition, the parity operator 141, based on one or more stripe data elements of the data unit, creates a partial operation result by performing a partial operation equivalent to a part of a rebuild processing operation for rebuilding any data element.

The transfer buffer 142 temporarily stores data, which has been sent from the lower-level storage apparatus 180, and data to be sent to the lower-level storage apparatus 180. The BE controller 143 communicates various commands, write data, read data and so forth between the lower-level storage apparatuses 180 of the DKU 160.

The DKU 160 comprises multiple lower-level storage apparatuses 180 (hereinafter, may be called drives). The lower-level storage apparatus 180 comprises one or more storage devices. The storage device is a nonvolatile storage medium, and, for example, is a magnetic disk, a flash memory, or another semiconductor memory. The DKU 160 comprises multiple groups (path groups) 170 of multiple lower-level storage apparatuses 180 coupled to the BE controller 143 via the same path. Lower-level storage apparatuses 180, which belong to the same path group 170, are coupled together via a switch 161. The lower-level storage apparatuses 180 belonging to the same path group 170 are able to communicate directly, and, for example, one lower-level storage apparatus 180 is able to send various data to another lower-level storage apparatus 180 belonging to the same path group 170. Furthermore, lower-level storage apparatuses 180, which belong to different path groups 170, are not able to communicate directly. However, depending on the coupling method of the switch 161, it is also possible to make all the lower-level storage apparatuses 180 in the higher-level storage apparatus 100 accessible to one another. In accordance with this, all of the lower-level storage apparatuses 180 may be one huge path group 170, or an aggregate of lower-level storage apparatuses 180 whose relationship to one another is closely connected, that is, lower-level storage apparatuses 180, which either have large numbers of communication channels or have communication channels with high throughput, may be a path group 170.

Figure 2:
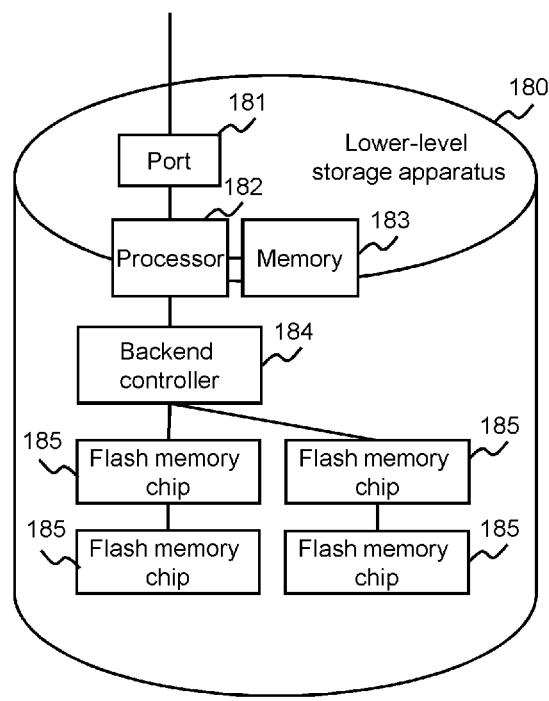
FIG. 2 is a block diagram of a lower-level storage apparatus related to Example 1.

FIG. 2 is a block diagram of a lower-level storage apparatus related to Example 1.

The lower-level storage apparatus 180 comprises a port 181, a processor 182 as an example of a third control device, a memory 183, a backend controller 184, and one or more flash memory chips 185.

The port 181 is an interface for communicating with either the BE controller 143 or another lower-level storage apparatus 180. The memory 183 stores a program and various types of information. The processor 182 executes a program stored in the memory 183, and performs various processing using the information stored in the memory 183. In the example, the processor 182 executes a process corresponding to a command, which will be explained further below, sent via the BEPK 140. The processor 182 also executes the same arithmetic processing as the parity operator 141. The backend controller 184 mediates the exchange of data with a flash memory chip 185. The flash memory chip 185, for example, may be a NAND-type flash memory chip, may be another type (for example, a NOR type) flash memory, or may be a PRAM or a ReRAM. Alternatively, it may be a magnetic disk. A parity operator may also be provided in the lower-level storage apparatus 180.

Figure 3:
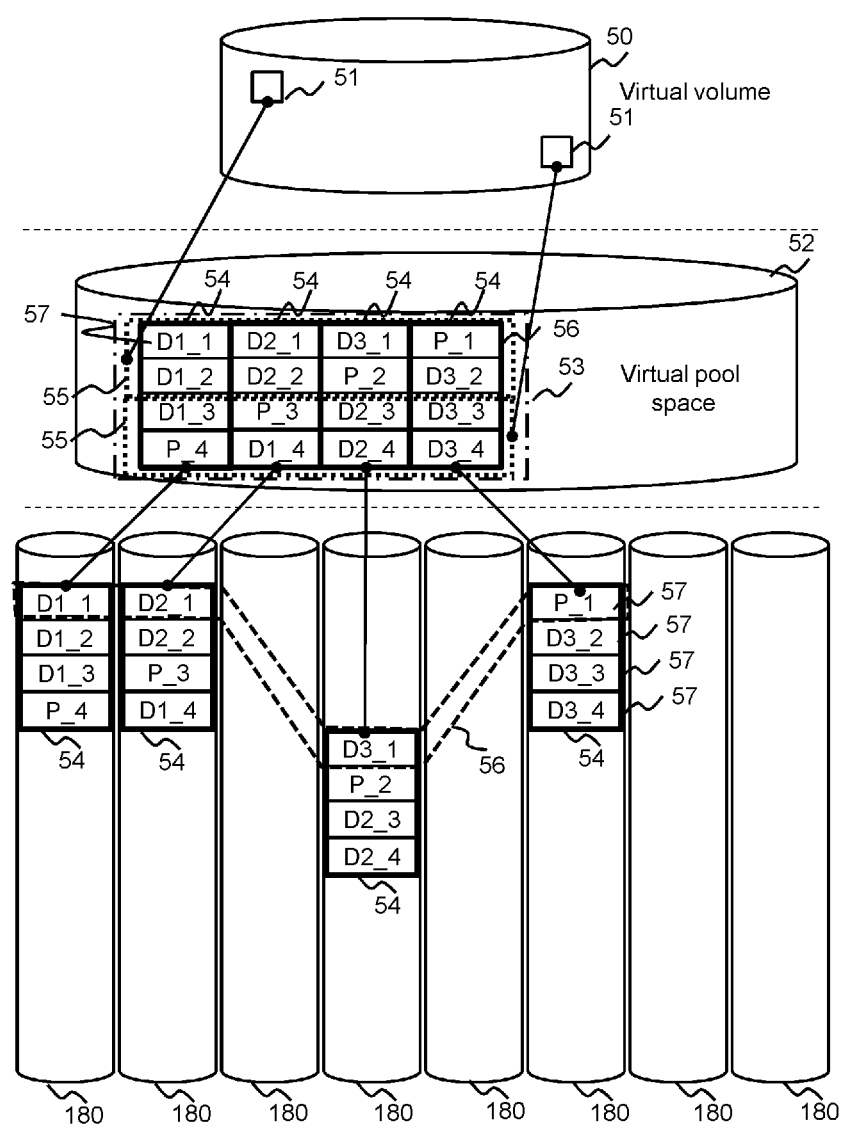
FIG. 3 is a logical block diagram of data related to Example 1.

FIG. 3 is a logical block diagram of data related to Example 1.

A virtual volume 50 recognizable by the host 10 comprises multiple virtual pages (virtual logical pages) 51. A physical page 55 of a virtual pool space 52 is allocated to a virtual page 51. One or more extents 53 are managed in the virtual pool space 52. The extent 53 comprises multiple parcels (Parcel) 54. A parcel 54 comprises consecutive areas in a single storage apparatus (for example, a lower-level storage apparatus 180). The parcel 54 comprises four stripes 57 in the example of FIG. 3.

As shown in FIG. 3, in the case of a RAID5 (3D+1P) configuration, that is, a configuration in which three data elements (D), which comprise a data unit, and one parity (P) corresponding to these data elements are stored in respectively different storage apparatuses, for example, the extent 53 comprises the parcels 54 of four different lower-level storage apparatuses 180. Since a distributed RAID configuration has been adopted in this example, the extent 53 comprises the parcels 54 of four different lower-level storage apparatuses 180 from among multiple (a number larger than the four required at a minimum for 3D+1P (for example, eight)) lower-level storage apparatuses 180, which comprise the storage area of the virtual pool space 52, and the combination of the lower-level storage apparatuses 180, which comprise the parcels 54 making up each extent 53, is not fixed.

The extent 53 comprises multiple (for example, two) physical pages 55. The physical page 55 is able to store the data elements of multiple (for example, two) consecutive data units and parity (data in the same row of stripes 56). In this drawing, reference signs, which have numerals following a "_" in common, such as D1_1, D2_1, D3_1, P_1, indicate data elements, which are in the same data unit, and parity. The data element and the parity are each the size of a stripe 57.

Figure 4:
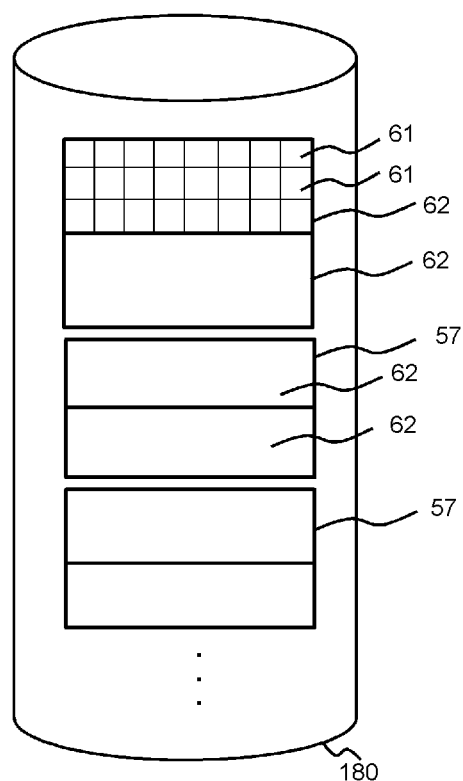
FIG. 4 is a logical block diagram of data in a lower-level storage apparatus related to Example 1.

FIG. 4 is a logical block diagram of data in a lower-level storage apparatus related to Example 1.

The lower-level storage apparatus 180 is able to transfer data to a higher-level apparatus using a sub-block 61, which is the smallest unit (for example, 512B) of a SCSI command process, as a unit. A slot 62, which is the management unit (for example, 256 KB) used for caching data to the cache memory 131, comprises an aggregate of multiple consecutive sub-blocks 61. The stripe 57 is stored in multiple slots 62. The size of the stripe 57, for example, is 512 KB when the stripe 57 is configured using two slots 62.

Figures 5, 6:
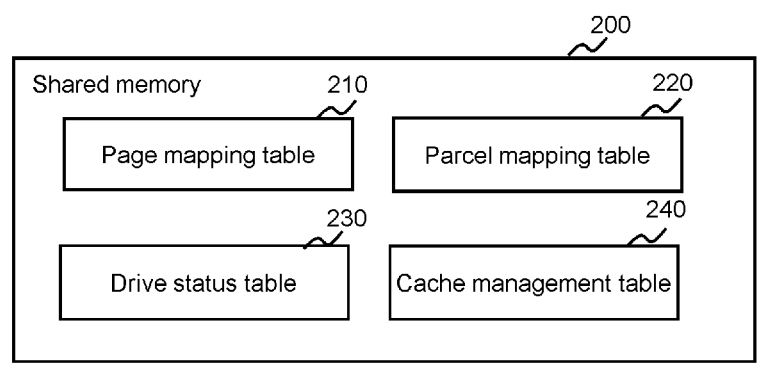
FIG. 5 is a diagram showing tables in a shared memory related to Example 1.
FIG. 6 is a diagram showing an example of a page mapping table related to Example 1.

FIG. 5 is a diagram showing the tables in a shared memory related to Example 1.

The shared memory 200, for example, is configured using at least any one storage area of the lower-level storage apparatus 180, the CM 131, and the LM 122. The logical shared memory 200 may also comprise a storage area comprising multiple of the lower-level storage apparatus 180, the CM 131, and the LM 122, and cache management may be performed for each type of information.

The shared memory 200 stores a page mapping table 210, a parcel mapping table 220, a drive status table 230, and a cache management table 240. Each table will be explained in detail below.

FIG. 6 is a diagram showing an example of the page mapping table related to Example 1.

The page mapping table 210 is information showing the corresponding relationship between a logical page 51 of a virtual volume 50 and a physical page 55 of the virtual pool space 52. The page mapping table 210 manages an entry comprising the fields of a virtual volume number 211, a logical page number 212, a pool number 213, a virtual pool space number 214, and a physical page number 215.

A number of a virtual volume 50 (a virtual volume number) is stored in the virtual volume number 211. A number (a logical page number) of a logical page in the virtual volume 50 indicated by the virtual volume number in the virtual volume number 211 of the entry is stored in the logical page number 212. A number of a pool, which comprises a physical page allocated to a logical page corresponding to the logical page number in the logical page number 212 of the entry, is stored in the pool number 213. A number (a virtual pool space number) of a virtual pool space, which comprises a physical page allocated to the logical page corresponding to the logical page number in the logical page number 212, in the pool of the pool number in the pool number 213 of the entry, is stored in the virtual pool space number 214. A number (a physical page number) of the physical page allocated to the logical page corresponding to the logical page number in the logical page number 212 of the entry, is stored in the physical page number 215. The physical page number, for example, is the LBA (address of a sub-block unit).

According to the entry at the very top of FIG. 6, it is clear that a physical page with the physical page number "0" in a virtual pool space having the virtual pool space number "2" of a pool with the pool number "0" is allocated to a logical page having the logical page number "1" in a virtual volume having the virtual volume number "1".

FIG. 7 is a diagram showing an example of a parcel mapping table related to Example 1.

The parcel mapping table 220 is for managing a physical parcel 54 allocated to an extent 53. The parcel mapping table 220 manages an entry comprising the fields of a virtual pool space number 221, an extent number (#) 222, a drive offset number (#) 223, a physical drive number (#) 224, a physical parcel number (#) 225, and a parcel status 226.

A number (a virtual pool space number) of a virtual pool space is stored in the virtual pool space number 221. A number (an extent number) of an extent in the virtual pool space corresponding to the virtual pool space number in the virtual pool space number 221 of the entry is stored in the extent #222. A number (a drive offset number) of a drive offset in the extent corresponding to the extent number in the extent #222 of the entry is stored in the drive offset #223. The drive offset number here is a number indicating any of the drives in the RAID group configuration (for example, 3D+1P), and in this example, four drive offset numbers, i.e., 0 through 3, are correspondingly managed as the drive offset numbers with respect to one extent in one virtual pool space. A number (a physical drive number) of a physical drive (for example, a lower-level storage apparatus) for storing a physical parcel allocated to the drive having the drive offset number in the drive offset #223 of the entry is stored in the physical drive #224. A number of a physical parcel, which is allocated to the drive of the drive offset number, is stored in the physical parcel #225. A status of a physical parcel corresponding to the physical parcel number in the physical parcel #225 of the entry is stored in the parcel status 226. In this example, in a case where a rebuild is required for a data element stored in a parcel, "rebuild required", which indicates this fact, is configured in the parcel status 226, and in other cases, a blank space is configured. For example, in a case where the lower-level storage apparatus 180 is in a failure state, the MP 121 configures "rebuild required" in the parcel status 226 of the entry corresponding to the parcel of this lower-level storage apparatus 180.

FIG. 8 is a diagram showing an example of a drive status table related to Example 1.

The drive status table 230 manages the status of a physical drive (for example, a lower-level storage apparatus 180) comprising a virtual pool space 52. The drive status table 230 manages an entry comprising the fields of a virtual pool space number 231, a physical drive number 232, and a status 233. A number (a virtual pool space number) of a virtual pool space is stored in the virtual pool space number 231. A number (a physical drive number) of a physical drive, which comprises the virtual pool space corresponding to the virtual pool space number in the virtual pool space number 231 of the entry, is stored in the physical drive number 232. A status of the physical drive corresponding to the physical drive number in the physical drive number 232 of the entry is stored in the status 233. As the physical drive status, either "normal", which shows that the physical drive is normal, or "abnormal (R/W not possible)", which shows that it is not possible to read/write from/to the physical drive, is configured.

Figures 9, 10:
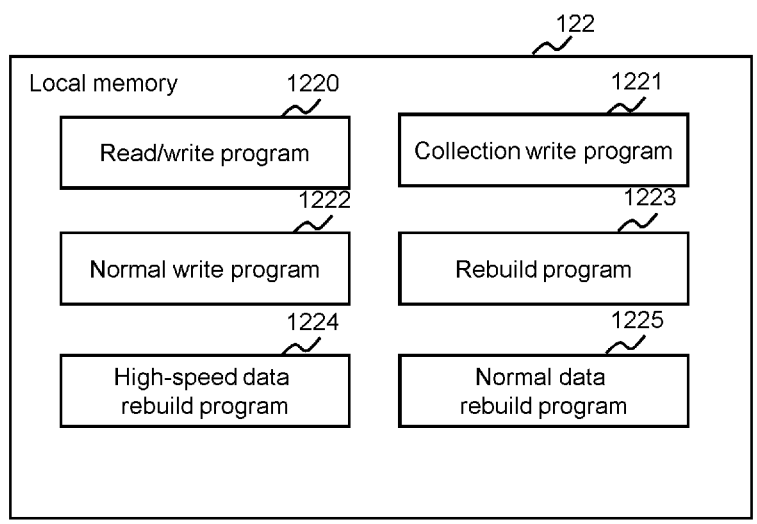
FIG. 9 is a diagram showing an example of a cache management table related to Example 1.
FIG. 10 is a block diagram of a local memory related to Example 1.

FIG. 9 is a diagram showing an example of a cache management table related to Example 1.

The cache management table 240 manages an entry comprising the fields of a virtual volume number 241, a volume slot number 242, a cache slot number 243, a destage inhibit flag 244, and a dirty bitmap 245.

A number of a virtual volume (a virtual volume number) is stored in the virtual volume number 241. A number (a volume slot number) of a volume slot of a virtual volume corresponding to the virtual volume number in the virtual volume number 241 of the entry is stored in the volume slot number 242. A number (a cache slot number) of a cache slot in the CM 131 in which is stored the volume slot corresponding to the volume slot number in the volume slot number 242 is stored in the cache slot number 243. In this example, the number (the number to which (data) is appended in the drawing) of the cache slot for storing the data element stored in the volume slot, and the number (the number to which (parity) is appended in the drawing) of the cache slot for storing the parity for rebuilding the data element stored in the volume slot are stored in the cache slot number 243. A destage inhibit flag, which indicates whether data of a cache slot corresponding to the cache slot number in the cache slot number 243 of the entry should be destaged, or should be removed from the cache slot of the CM 131 by being written to the storage apparatus, is stored in the destage inhibit flag 244. An aggregate of bits (a bitmap) showing whether or not the data of each sub-block in the cache slot corresponding to the cache slot number in the cache slot number 243 of the entry is dirty data is stored in the dirty bitmap 245.

FIG. 10 is a block diagram of a local memory related to Example 1.

Figure 16:
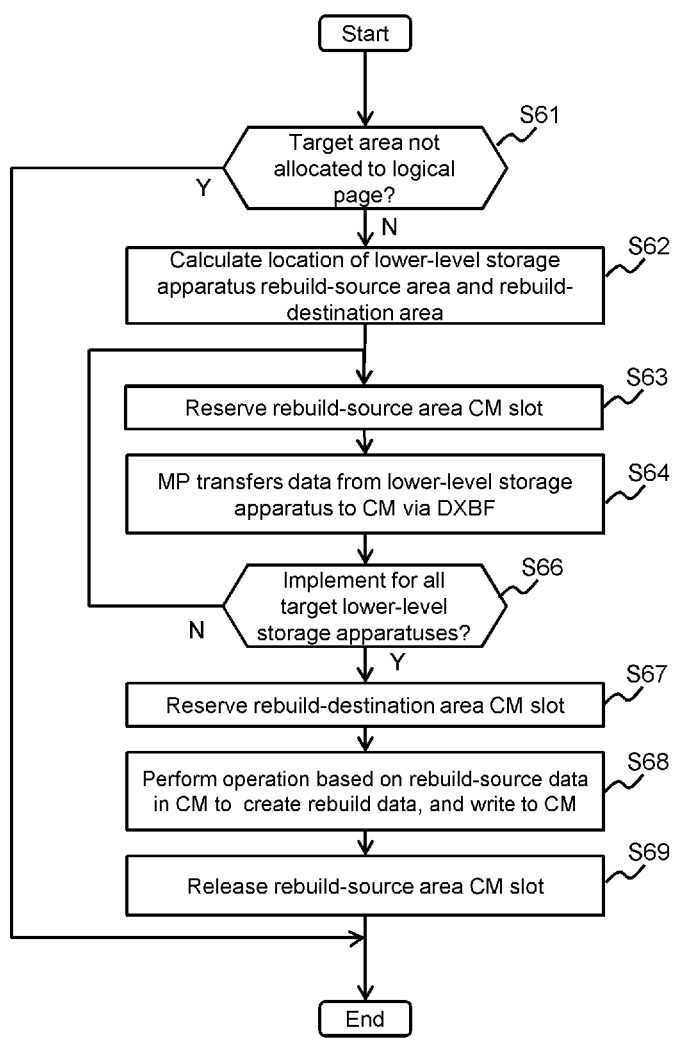
FIG. 16 is a flowchart of a normal data rebuild process related to Example 1.

The local memory 122 stores a read/write program 1220, a bulk writing program 1221, a normal write program 1222, a rebuild program 1223, a high-speed data rebuild program 1224, and a normal data rebuild program 1225. The read/write program 1220 is for executing a read/write process (refer to FIG. 11). The bulk writing program 1221 is for executing a bulk writing process (refer to FIG. 12). The normal write program 1222 is for executing a normal write process. The rebuild program 1223 is for executing a rebuild process (refer to FIG. 13). The high-speed data rebuild program 1224 is for executing a high-speed data rebuild process (refer to FIG. 14). The normal data rebuild program 1225 is for executing a normal data rebuild process (FIG. 16).

The processing operations of the computer system related to Example 1 will be explained next.

Figure 11:
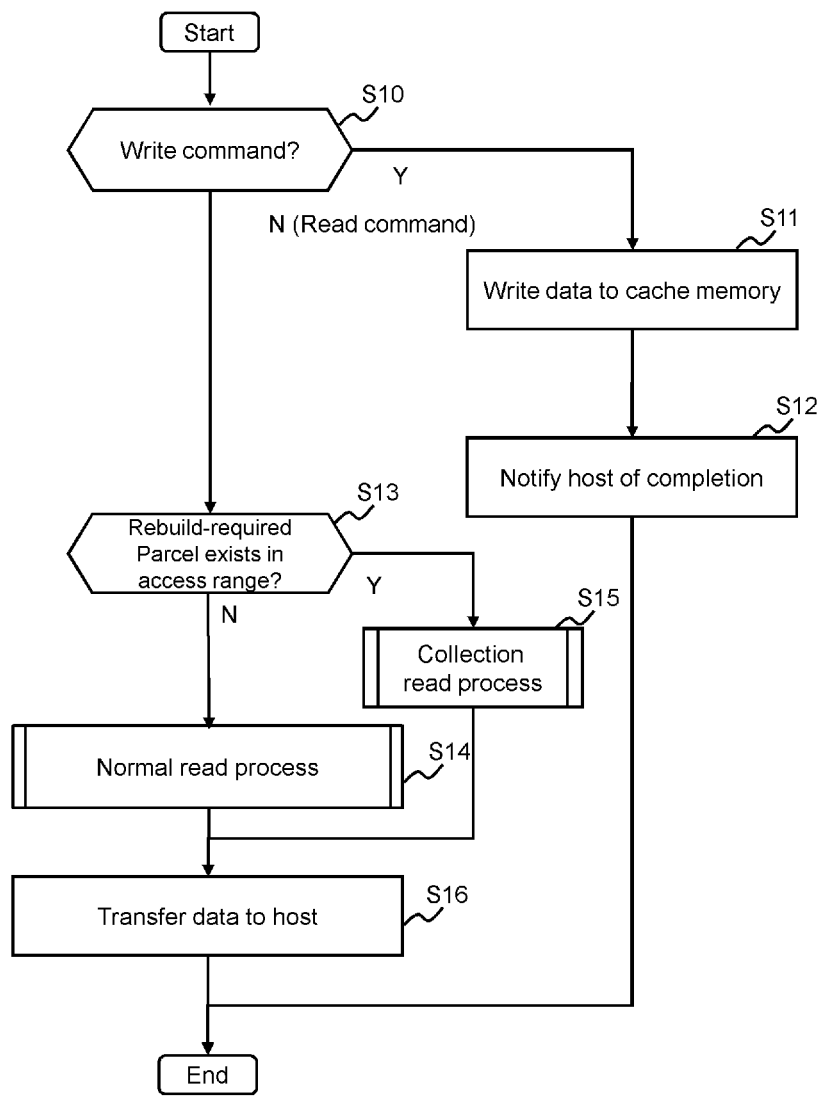
FIG. 11 is a flowchart of a read/write process related to Example 1.

FIG. 11 is a flowchart of a read/write process related to Example 1.

The read/write process is executed in a case where the MP 121 has received an I/O command (a read command or a write command) from the host 10 by way of the port 111 of the FEPK 110.

The MP 121 determines whether or not the received command is a write command (Step S10). In a case where the result thereof is that it is a write command (Step S10: Y), the MP 121 receives write-data corresponding to the write command from the host 10 and writes it to the cache memory 131 (Step S11), and sends a notification of completion to the host 10 via the port 111 of the FEPK 110 (Step S12).

Alternatively, in a case where the received command is not a write command, that is, it is a read command (Step S10: N), the MP 121 determines whether or not a rebuild-required parcel exists within the access range of the storage apparatus (either a lower-level storage apparatus 180 or an external storage apparatus 40) targeted by the read command (Step S13). The read command comprises a virtual volume number and a logical page number, which are targeted for access. At this point, it is possible to determine whether or not a rebuild-required parcel exists within the access range targeted by the read command by using the page mapping table 210 to identify the virtual pool space and physical page targeted for access by the read command, and using the parcel mapping table 220 to acquire the value of the parcel status 226, which corresponds to the parcel corresponding to the physical page.

The parcel corresponding to the physical page can be identified by computing the drive offset based on a quotient obtained by dividing the virtual pool space address (the physical page number (for example, the LBA (the address of the sub-block unit))) by the size of the stripe data.

More specifically, first the extent # is computed using the following formula.

The extent # is determined by extent #=floor (floor (LBA× number of Ds/(number of Ds+number of Ps))/physical size of extent). Here, the number of Ds is the number of data elements in the RAID row of stripes, and the number of Ps is the number of parity in the row of stripes. The physical size of the extent is the number of sub-blocks.

Next, the drive offset # is computed using the following formula.

Drive offset #=(floor((floor(LBA/(stripe data size/sub-block size)))/number of Ds)+(floor(LBA/stripe data size/sub-block size))MOD number of Ds)MOD(number of Ds+number of Ps)

By doing so, it is possible to identify the virtual pool space number, the extent #, and the drive offset #, which are targeted for access, and the physical drive # and the physical parcel # can be identified by referencing the parcel mapping table 220.

In a case where the result of the determination of Step S13 is that a rebuild-required parcel does not exist (Step S13: N), the MP 121 executes a normal read process (Step S14), and advances the processing to Step S16. In the normal read process here, the MP 121 sends a read request to the storage apparatus comprising the access-range parcel, and acquires the read-target data.

Alternatively, in a case where the result of the determination of Step S13 is that a rebuild-required parcel exists (Step S13: Y), the MP 121 executes a correction read process (Step S15) and advances the processing to Step S16. In the correction read process here, the MP 121 rebuilds a data element in need of rebuilding by using a process identical to a high-speed data rebuild process (refer to FIG. 14), which will be explained further below, for the data element of the rebuild-required parcel, and acquires the relevant rebuilt data element from the storage apparatus.

In Step S16, the MP 121 transfers the acquired data to the host 10 via the FEPK 110.

Figure 12:
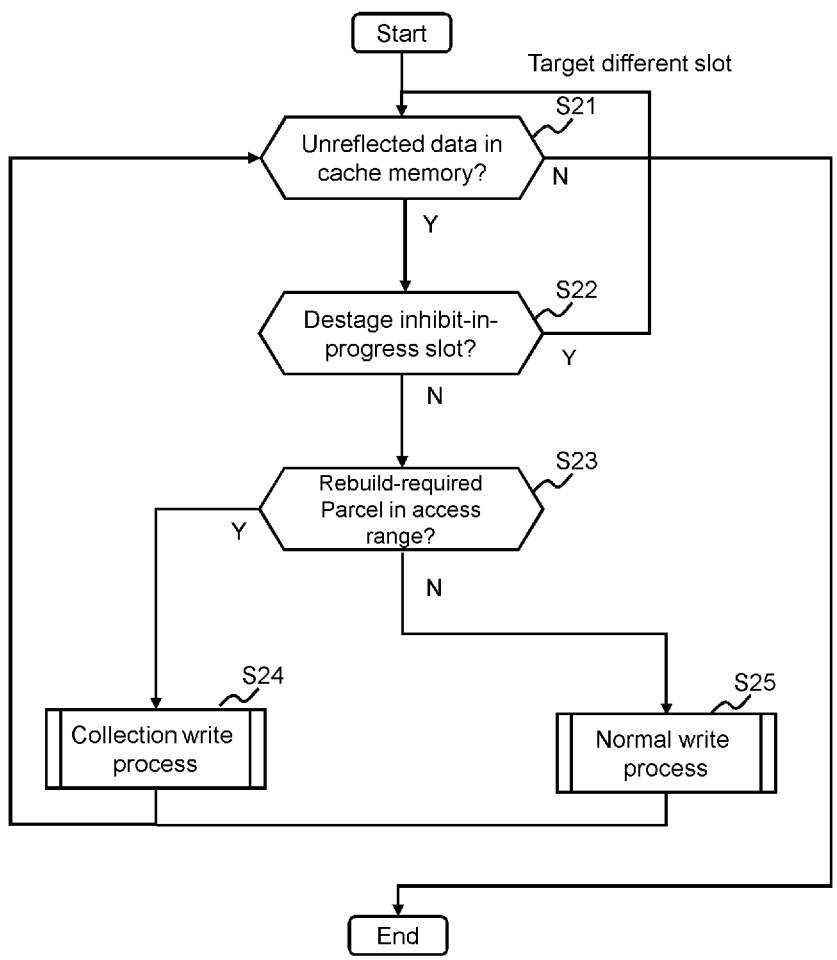
FIG. 12 is a flowchart of a bulk writing process related to Example 1.

FIG. 12 is a flowchart of a bulk writing process related to Example 1.

The bulk writing process, for example, is executed regularly. The MP 121 determines whether or not a slot comprising data, which has not been reflected in the storage apparatus, exists in the cache memory 131 (Step S21). It is possible to discern whether or not a slot comprising unreflected data exists by referencing the cache management table 240. In a case where the result thereof is that a slot comprising unreflected data does not exist (Step S21: N), the MP 121 ends the bulk writing process.

Alternatively, in a case where a slot comprising unreflected data exists (Step S21: Y), the MP 121 references the destage inhibit flag 244 of the entry corresponding to the relevant slot of the cache management table 240, and determines whether or not the relevant slot is a destage inhibit-in-progress slot (Step S22).

A case in which the result thereof is that the slot is a destage inhibit-in-progress slot (Step S22: Y) indicates that the data included in the slot is being used in a rebuild, and as such, the MP 121 moves to Step S21 without reflecting the relevant slot data in the storage apparatus, and targets another slot for the processing. Alternatively, in a case where the slot is not in the process of inhibiting a destage (Step S22: N), the MP 121 determines whether or not a rebuild-required parcel exists in the storage apparatus range (access range) for writing the relevant slot data (Step S23).

In a case where the result of the determination of Step S23 is that a rebuild-required parcel exists (Step S23: Y), the MP 121 executes a correction write process (Step S24) and moves the processing to Step S21. In the correction write process here, the MP 121 uses the slot data to create a new parity for the storage apparatus, and stores the relevant parity in the storage apparatus. Specifically, in a case where the correction write target is D (data), all of the other old data of the row of stripes is read from the lower-level storage apparatus 180, new parity is created using an exclusive OR, and the new data and the new parity are written to the lower-level storage apparatus 180. In a case where the correction write target is P (parity), only the new data is written to the lower-level storage apparatus 180 since the parity does not need to be updated. In addition, the MP 121 rebuilds the data element that needs rebuilding by using the same process as a high-speed data rebuild process (refer to FIG. 14), which will be explained further below, for the data element of the rebuild-required parcel, and stores this rebuilt data element in the storage apparatus.

Alternatively, in a case where the result of the determination of Step S23 is that a rebuild-required parcel does not exist (Step S23: N), the MP 121 executes a normal write process (Step S25), and moves the processing to Step S21. In the normal write process here, the MP 121 sends a prescribed command (a XDWRITE command) for storing a data element to the storage apparatus (for example, the lower-level storage apparatus 180), which is storing the data element of the row of stripes corresponding to the slot data. At this time, the MP 121 sends the data element of the CM 131 to the lower-level storage apparatus 180, which is storing the data element of the row of stripes corresponding to the slot data, by way of the transfer buffer 142. The MP 121 also sends a prescribed command (a XPWRITE command) for creating and storing a new parity to the lower-level storage apparatus 180, which is storing the parity of the row of stripes corresponding to the slot data. At this time, the MP 121 sends the data element of the CM 131 to the lower-level storage apparatus 180, which is storing the parity of the row of stripes corresponding to the slot data, by way of the transfer buffer 142. The lower-level storage apparatus 180, which receives the XDWRITE command, stores the received data element in a specified area. Meanwhile, the lower-level storage apparatus 180, which receives the XPWRITE command, uses the received data element to create a new parity and stores the created new parity in a specified area.

Figure 13:
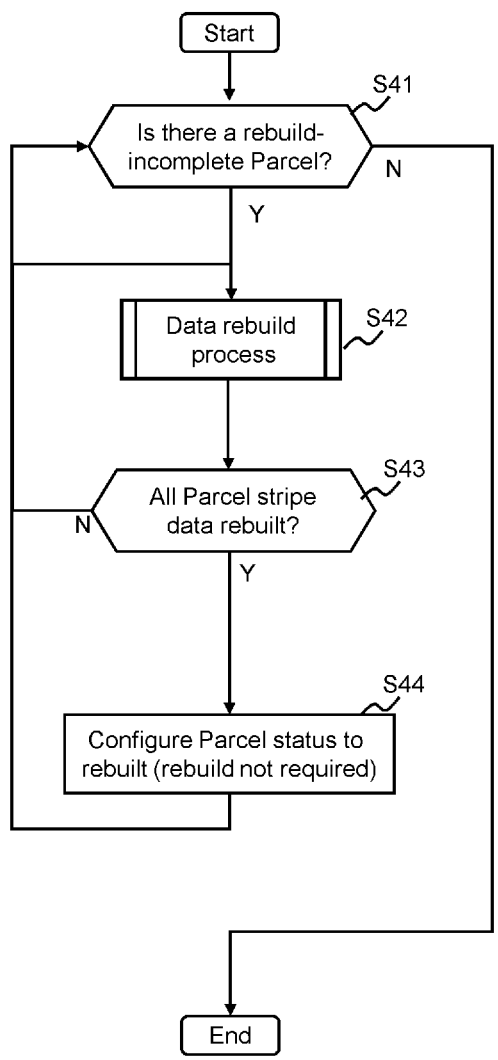
FIG. 13 is a flowchart of a rebuild process related to Example 1.

FIG. 13 is a flowchart of a rebuild process related to Example 1.

The rebuild process is executed at an arbitrary timing. The MP 121 references the parcel mapping table 220, and determines whether or not there is a parcel for which a rebuild is incomplete, that is, whether or not a parcel having a parcel status of "rebuild required" exists (Step S41). In a case where the result thereof is that a rebuild-incomplete parcel does not exist (Step S41: N), the MP 121 ends the rebuild process. Alternatively, in a case where a rebuild-incomplete parcel exists (Step S41: Y), the MP 121 starts execution of a data rebuild process for the data of a single stripe (a stripe data element) of a single rebuild-incomplete parcel (Step S42). The data rebuild process here includes a high-speed data rebuild process (refer to FIG. 14) and a normal data rebuild process (refer to FIG. 16). Normally, the high-speed data rebuild process (refer to FIG. 14) may be executed as the data rebuild process to be executed here. Furthermore, either the high-speed data rebuild process or the normal data rebuild process, whichever process is selected by the user, may be performed.

Next, the MP 121 determines whether or not all the stripe data of the parcel has been rebuilt (Step S43). In a case where the result thereof is that all of the stripe data has not been rebuilt (Step S43: N), the MP 121 moves the processing to Step S41. Alternatively, in a case where all the stripe data of the parcel has been rebuilt (Step S43: Y), the MP 121 configures the parcel status 226 of the entry corresponding to the relevant parcel of the parcel mapping table 220 to rebuild complete (rebuild not required) (Step S44), and moves the processing to Step S41.

The MP 121 may execute multiple rebuild processes in parallel for multiple rebuild-incomplete parcels. In so doing, it is possible to reduce the rebuild processing time for the multiple parcels. In a case where the rebuild processing is executed in parallel, as a parcel to be targeted for one rebuild process, the MP 121 may select from among the parcels of a storage apparatus other than the storage apparatus comprising the parcels (a rebuild-source parcel and a rebuild-destination parcel) being used in the other rebuild process. In so doing, it is possible to reduce the access contention with respect to the storage apparatus, and to enhance the parallel effects of the multiple rebuild processes, as a result making it possible to effectively shorten the time required for the rebuild processing.

Figure 14:
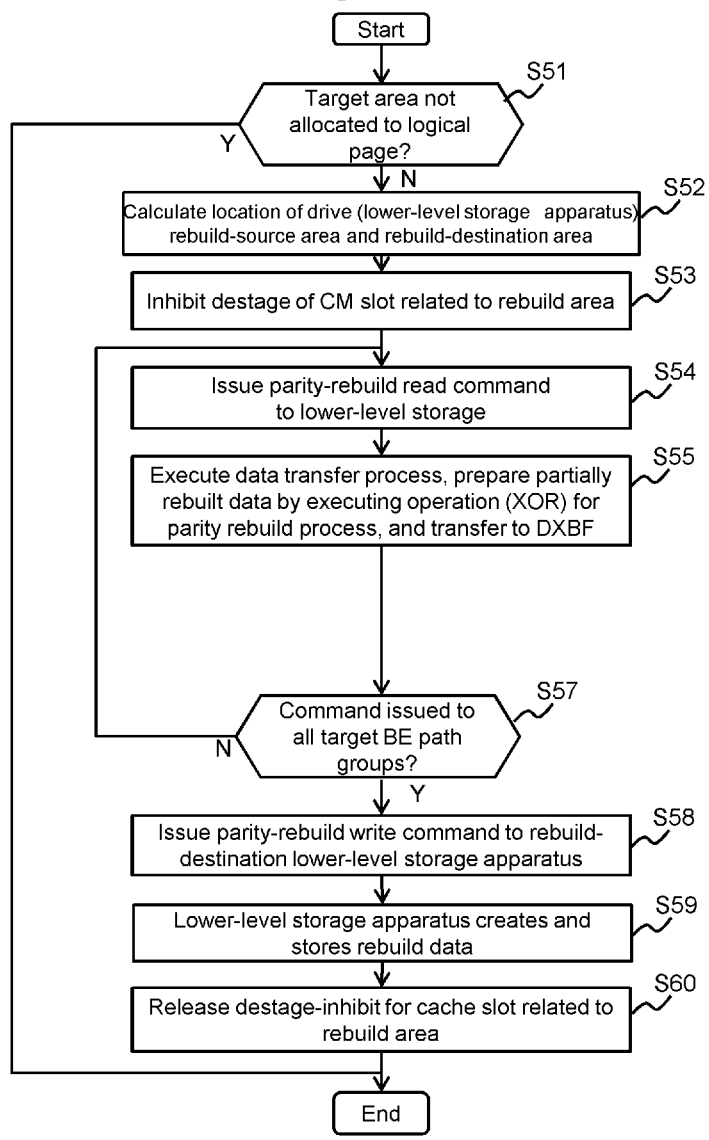
FIG. 14 is a flowchart of higher-level storage apparatus-side processing in a high-speed data rebuild process related to Example 1.

FIG. 14 is a flowchart of a high-speed data rebuild process related to Example 1. In this drawing, an example of a case in which a RAID group comprises multiple lower-level storage apparatuses 180 is illustrated.

The MP 121 determines whether or not the stripe of the rebuild-target parcel, which is the rebuild-target area, is not allocated to a logical page (Step S51). It is possible to discern whether or not the stripe of the rebuild-target parcel is not allocated to a logical page here by using the parcel mapping table 220 to identify the virtual pool space number, the extent number, and the drive offset # corresponding to the rebuild-target parcel stripe, identify a physical page number based on the relevant extent number and drive offset #, and using the page mapping table 210 to identify whether or not the identified physical page number is associated with a logical page number.

In a case where the result thereof is that the rebuild-target parcel stripe is not allocated to a logical page (Step S51: Y), the MP 121 ends the high-speed data rebuild process.

Alternatively, in a case where the rebuild-target parcel stripe is allocated to a logical page (Step S51: N), the MP 121, based on the parcel mapping table 220, computes the lower-level storage apparatus 180, which stores the rebuild-source area and the rebuild-destination area, and the location in the lower-level storage apparatus 180 of the rebuild-source area and the rebuild-destination area (Step S52). The rebuild-source area here is an area of a stripe data element other than the stripe data element of the rebuild-target stripe. For example, in the case of a RAID5 3D1P configuration, the rebuild-source area is three areas, and in the case of a RAID6 6D2P configuration, the rebuild-source area is six areas. In a case where the rebuild-destination area is an area of a different lower-level storage apparatus 180 from the lower-level storage apparatus 180 of the rebuild-source area, the rebuild-destination area may be an arbitrary area.

Next, the MP 121 configures the destage inhibit flag in the destage inhibit flag 244 of the cache management table 240 corresponding to the CM 131 slot, which is related to the rebuild area (the rebuild-source area and the rebuild-destination area), to ON (Step S53). This is implemented for the purpose of preventing the data from being updated by a host I/O while a data rebuild process is being executed. Next, the MP 121 issues a parity-rebuild read command to the lower-level storage apparatus 180 (Step S54). At this point, a rebuild-source area belonging to the same path group from among the rebuild-source areas identified in Step S52 is configured in the rebuild-source area of the parity-rebuild read command. In this example, the parity-rebuild read command is not issued to the path group belonging to the lower-level storage apparatus 180 of the rebuild-destination area.

The processor 182 of the lower-level storage apparatus 180, upon receiving the parity-rebuild read command via the port 181, acquires the data elements and/or parity needed for a rebuild from another lower-level storage apparatus 180 in the same path group in accordance with executing the processing corresponding to the parity-rebuild read command, and based on the acquired data element and/or parity, executes a parity rebuild operation (exclusive OR), creates an execution result (partially rebuilt data), and sends the relevant execution result to the transfer buffer 142 (Step S55). In accordance with this, the execution result is stored in the transfer buffer 142. Since only one execution result is sent from one path group at this time, it is possible to reduce the volume of communications between the lower-level storage apparatus 180 and the BEPK 140. Also, since the execution result is not stored in the CM 131, the load on the CM 131 and the internal network 150 is reduced.

Next, the MP 121 determines whether or not the parity-rebuild read command has been issued to all the path groups, which include the rebuild-source area, and, in addition, all the path groups, which do not include the rebuild-destination area (Step S57).

In a case where the result thereof is that the parity-rebuild read command has not been issued to all the path groups, which include the rebuild-source area, and, in addition, all the path groups, which do not include the rebuild-destination area (Step S57: N), the MP 121 moves the processing to Step S54.

Alternatively, in a case where the parity-rebuild read command has been issued to all the path groups, which include the rebuild-source area, and, in addition, all the path groups, which do not include the rebuild-destination area (Step S57: Y), the MP 121 issues the parity-rebuild write command and sends one or more pieces of partially rebuilt data being stored in the transfer buffer 142 to the rebuild-destination area lower-level storage apparatus 180 (Step S58). The rebuild-source area of the lower-level storage apparatus 180, which belongs to the path group including the rebuild-destination area lower-level storage apparatus 180 from among the rebuild-source areas computed in Step S52, is configured in the rebuild-source area of the parity-rebuild write command.

The processor 182 of the lower-level storage apparatus 180, upon receiving the parity-rebuild write command, receives the one or more pieces of partially rebuilt data being stored in the transfer buffer 142 by executing the processing corresponding to the parity-rebuild write command. The processor 182 also acquires the data element and or parity needed for a rebuild from another lower-level storage apparatus 180 in the same path group, and based on the acquired data element and/or parity, executes a rebuild operation (exclusive OR), and creates an execution result (partially rebuilt data). Next, the processor 182 performs a rebuild operation (for example, an exclusive OR) with respect to the created partially rebuilt data and the partially rebuilt data acquired from the transfer buffer 142, creates a final rebuilt data, stores this final rebuilt data in an area specified by the parity-rebuild write command (Step S59), and sends a response with respect to the parity-rebuild write command to the MP 121.

The MP 121, upon receiving the response to the parity-rebuild write command, configures the destage inhibit flag in the destage inhibit flag 244 of the cache management table 240 corresponding to the CM 131 slot related to the rebuild area (the rebuild-source area and the rebuild-destination area) to OFF (Step S60), and ends the high-speed data rebuild process.

Figure 15:
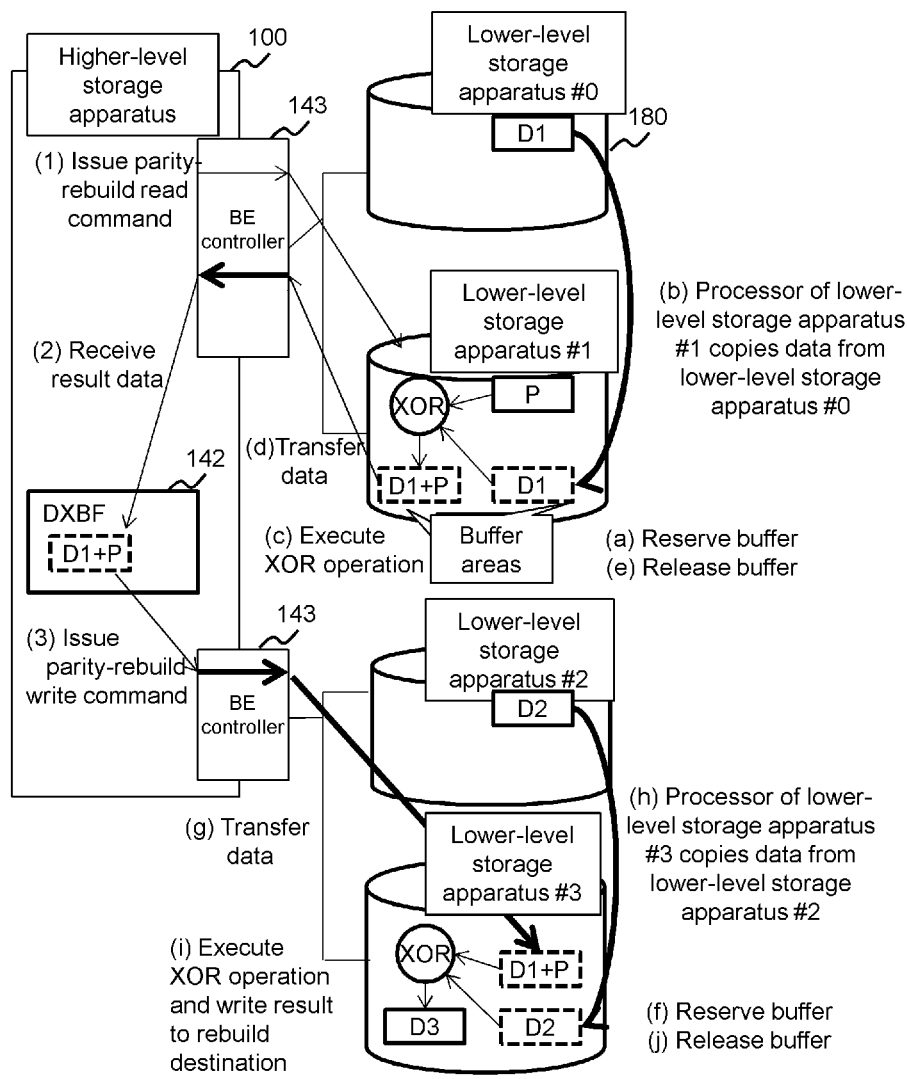
FIG. 15 is a schematic diagram illustrating a specific example of the high-speed data rebuild process related to Example 1.

FIG. 15 is a schematic diagram illustrating a specific example of the high-speed data rebuild process related to Example 1.

It is supposed here that a RAID5 (3D+1P) comprises multiple lower-level storage apparatuses 180, that data element D1 is stored in lower-level storage apparatus #0, P-parity is stored in lower-level storage apparatus #1, data element D2 is stored in lower-level storage apparatus #2, and data element D3 is stored in a lower-level storage apparatus 180 not shown in the drawing. It is also supposed that lower-level storage apparatus #0 and lower-level storage apparatus #1 belong to the same path group, and that lower-level storage apparatus #2 and lower-level storage apparatus #3 belong to the same path group.

The high-speed data rebuild process in a case where the lower-level storage apparatus 180 storing data element D3 fails and the data element D3 is rebuilt in lower-level storage apparatus #3 will be explained here.

In the high-speed data rebuild process, the MP 121 issues a parity-rebuild read command by way of the BE controller 143 to lower-level storage apparatus #1, which belongs to the path group storing data element D1 and P-parity in the same row of stripes as data element D3 ((1) in the drawing).

In the lower-level storage apparatus #1, the processor 182, upon receiving the parity-rebuild read command, starts the process conforming to the command, reserves a buffer in the memory 183 of the lower-level storage apparatus #1 ((a) in the drawing), acquires data element D1 from the lower-level storage apparatus #0 and copies this data element D1 to the buffer ((b) in the drawing), executes an exclusive OR with respect to the data element D1 and the P-parity of the same row of stripes stored in the lower-level storage apparatus #1, and sends the execution result (D1+P) to the higher-level storage apparatus 100 ((d) in the drawing). Thereafter, the processor 182 releases the buffer, which had been reserved in the memory 183 ((e) in the drawing).

In the higher-level storage apparatus 100, the MP 121 stores the execution result (D1+P) data, which has been sent from the lower-level storage apparatus #1, in the transfer buffer 142. The execution result (D1+P) stored in the transfer buffer 142 is not transferred to the CM 131.

Next, the MP 121 issues via the BE controller 143 a parity-rebuild write command to rebuild-destination lower-level storage apparatus #3, which is in a different path group from the path group to which the lower-level storage apparatus #1 belongs ((3) in the drawing).

In the lower-level storage apparatus #3, the processor 182, upon receiving the parity-rebuild write command, starts the process conforming to the command, reserves a buffer in the memory 183 of the lower-level storage apparatus #3 ((f) in the drawing), and receives the execution result (D1+P) transferred by the MP 121 from the transfer buffer 142 ((g) in the drawing). Next, the processor 182 of the lower-level storage apparatus #3 acquires from the lower-level storage apparatus #2 the data element D2 of the same row of stripes as the data element D3, copies this data element D2 to the buffer ((h) in the drawing), executes an exclusive OR with respect to the execution result (D1+P) stored in the buffer and the data element D2, rebuilds the data element D3, and stores the data element D3 in the rebuild-destination area of the lower-level storage apparatus #3 ((i) in the drawing).

According to the above-described processing, the data sent to the transfer buffer 142 from a single path group is a single execution result, thereby making it possible to reduce the amount of data transferred between the lower-level storage apparatus 180 and the BEPK 140. Also, the execution result, which is sent from the BEPK 140 to the rebuild-destination lower-level storage apparatus 180, is the number of the transfer-source path groups (one in this example), making it possible to reduce the amount of data transferred between the lower-level storage apparatus 180 and the BEPK 140.

FIG. 16 is a flowchart of a normal data rebuild process related to Example 1.

The MP 121 determines whether or not the stripe of the rebuild-target parcel, which is the rebuild-target area, is not allocated to a logical page (Step S61). It is possible to discern whether or not the stripe of the rebuild-target parcel is not allocated to a logical page here by using the parcel mapping table 220 to identify the virtual pool space number, the extent number, and the drive offset # corresponding to the rebuild-target parcel stripe, and identify a physical page number based on the relevant extent number and drive offset #, and using the page mapping table 210 to identify whether or not the identified physical page number is associated with a logical page number.

In a case where the result thereof is that the rebuild-target parcel stripe is not allocated to a logical page (Step S61: Y), the MP 121 ends the normal data rebuild process.

Alternatively, in a case where the rebuild-target parcel stripe is allocated to a logical page (Step S61: N), the MP 121, based on the parcel mapping table 220, computes the lower-level storage apparatus 180, which stores the rebuild-source area and the rebuild-destination area, and the locations in the lower-level storage apparatus 180 of the rebuild-source area and the rebuild-destination area (Step S62).

Next, the MP 121 reserves a cache slot for storing the data of the rebuild-source area in the CM 131, and acquires a lock for the reserved cache slot (Step S63). Next, the MP 121 transfers the data element and/or parity of the rebuild-source area from the rebuild-source area lower-level storage apparatus 180 to the lock-acquired cache slot by way of the transfer buffer 142 (Step S64).

Next, the MP 121 determines whether or not the data element and/or parity of the rebuild-source area has been transferred from all the rebuild-source area lower-level storage apparatuses 180 (Step S66), and in a case where the result thereof is that the data element and/or parity of the rebuild-source area has not been transferred from all the rebuild-source area lower-level storage apparatuses 180 (Step S66: N), the MP 121 moves the processing to Step S63, and executes processing for the rebuild-source area lower-level storage apparatus 180, which has not been a target of the processing. Alternatively, in a case where the data element and/or parity of the rebuild-source area has been transferred from all the rebuild-source area lower-level storage apparatuses 180 (Step S66: Y), the MP 121 advances the processing to Step S67.

Next, the MP 121 reserves a cache slot for storing the rebuilt data in the CM 131 (Step S67). Next, the MP 121, based on the multiple pieces of rebuild-source area data in the CM 131, creates rebuilt data by executing the arithmetic processing for rebuilding the data, and stores the rebuilt data in the cache slot in the CM 131 (Step S68). The rebuilt data is subsequently stored in the lower-level storage apparatus 180 when the bulk writing process shown in FIG. 12 is executed. Next, the MP 121 releases the cache slot of the CM 131, where the rebuild-source area data had been stored (Step S69), and ends the normal data rebuild process.

Figure 17:
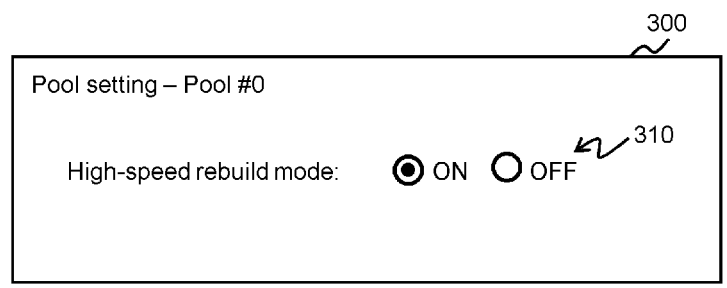
FIG. 17 is a diagram showing an example of a management screen on a management server related to Example 1.

FIG. 17 is a diagram showing an example of a management screen of the management server related to Example 1.

The management screen 300 is for the user to specify a type of data rebuild process for a data unit being managed in an area belonging to each pool. The management screen 300 comprises a data rebuild process setting area 310 in which are displayed radio buttons for specifying either the "ON" setting for the rebuild high-speed mode, that is, for executing the high-speed data rebuild process, or the "OFF" setting for not executing the high-speed data rebuild process. The setting content corresponding to the radio button selected using this data rebuild process setting area 310 is sent from the management server 20 to the higher-level storage apparatus 100, and, for example, is managed in the LM 122. The MP 121 executes the data rebuild process based on the setting content of the LM 122 when performing the data rebuild processing in Step S42 of FIG. 13.

The content for configuring a data rebuild process, which is to be executed having a pool as a unit, has been explained, but, for example, a data rebuild process to be executed having a virtual volume as a unit may be configured, or a data rebuild process to be executed having a higher-level storage apparatus as a unit may be configured.

Example 2

Example 2 will be explained next.

Example 2 is such that the virtual pool space 52 in Example 1 is configured as a RAID6 RAID group. Explanations of parts that are the same as Example 1 will be omitted.

Figure 18:
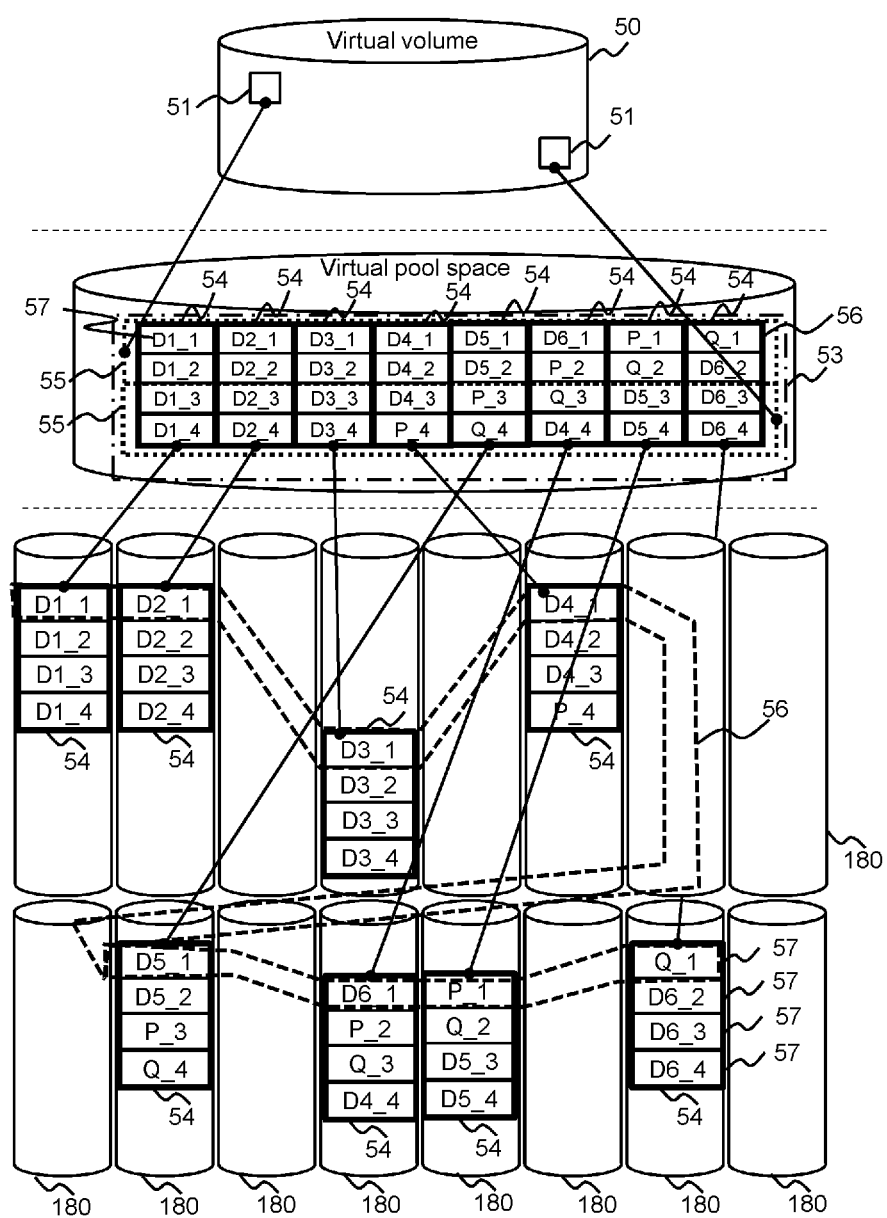
FIG. 18 is a logical block diagram of data related to Example 2.

FIG. 18 is a logical block diagram of data related to Example 2.

A virtual volume 50 recognizable to the host 10 comprises multiple virtual pages 51. A physical page 55 of a virtual pool space 52 is allocated to a virtual page 51.

An extent 53 is managed in the virtual pool space 52. The extent 53 comprises multiple parcels (Parcel) 54. The parcel 54 comprises consecutive areas in a single storage apparatus (for example, a lower-level storage apparatus 180). In FIG. 18, the parcel 54 comprises four stripes 57.

In the case of a RAID6 (6D+2P) configuration, that is, a configuration in which six data elements (D), which comprise a data unit, and two parity (P, Q) corresponding to these data elements are stored in respectively different storage apparatuses as shown in FIG. 18, for example, the extent 53 comprises eight different lower-level storage apparatus 180 parcels 54. Since a distributed RAID configuration has been adopted in this example, the extent 53 comprises the parcels 54 of eight different lower-level storage apparatuses 180 from among multiple (for example, 16) lower-level storage apparatuses 180, which comprise the storage area of the virtual pool space 52, and the combination of the storage apparatuses 180, which comprise the parcels 54 making up each extent 53, is not fixed.

The extent 53 comprises multiple (for example, two) physical pages 55. The physical page 55 is able to store the data elements of multiple (for example, two) data units and parity (data in the same row of stripes 56). In this drawing, reference signs, which have a numeral following a "_" in common, such as D1_1, D2_1, D3_1, D4_1, D5_1, D6_1, P_1, and Q_1, indicate data elements in the same data unit and parity. The data element and the parity are the size of a stripe 57.

In FIG. 18, an example, which configures a virtual pool space 52 using a RAID group of RAID6 having a 6D+2P configuration has been given, but the configuration of the RAID group is not limited thereto, and the number of Ds (the number of data elements) may be increased to achieve a 14D+2P configuration. In the extent 53, the parity may be stored in the same parcel as in RAID4. The method for encoding the Q-parity is not limited to a Galois computation, and may use another generally known method, such as the EVENODD method.

FIG. 19 is a diagram showing an example of a Galois computation coefficient table related to Example 2.

The Galois computation coefficient table 250 is for managing the Galois computation coefficient used in the operation utilized when creating the RAID6 Q-parity and when rebuilding a data element using the Q-parity. The Galois computation coefficient table 250 is stored in the shared memory 200, and physically, for example, in the LM 122 of the higher-level storage apparatus 100, and the MP 121 of the higher-level storage apparatus 100 stores the Galois computation coefficient table 250 in the memory 183 of the lower-level storage apparatus 180.

The Galois computation coefficient table 250 comprises the fields of a RAID type 251, a coefficient 252, and a value 253. A type indicating the configuration of the data elements and parity in the RAID6 is stored in the RAID type 251. A coefficient, which is used in the encoding of the Q-parity in a RAID group of a configuration corresponding to the type in the RAID type 251 of the entry, is stored in the coefficient 252. A value corresponding to the coefficient in the coefficient 252 of the entry is stored in the value 253. Referencing the Galois computation coefficient table 250 makes it possible to encode the Q-parity of the RAID group.

FIG. 20 is a diagram illustrating a method for creating rebuild data in the RAID.

This table shows the corresponding relationship among a number, a category, a loss category, a lost data type, and a method for creating rebuild data. The number (#) shows the number of an entry (row). The category shows the RAID level. The loss category shows the extent of the data loss. As the extent of loss, there is a single failure in which a single stripe data element in a row of stripes has been lost, and a double failure in which two stripe data elements in a row of stripes have been lost. The lost data type shows the type of data, which was lost. The data types include Dm and Dn, which indicate data elements, and P and Q, which indicate parity. The rebuild data creation method shows the method for creating rebuild data in a case where the extent of loss of the same row has occurred with respect to the RAID level of the same row, and data of the lost data type of the same row was lost.

Specifically, according to row #1, it is clear that in a case where a single failure has occurred in RAID5 and data element Dm has been lost, the data element Dm can be rebuilt using one type of data, which is the operational result of the following (math 1).

$$(P + \Sigma Di) \quad \text{[Math 1]}$$

In accordance with this, in the high-speed data rebuild process, the processor 182 of the lower-level storage apparatus 180 operates on either the (math 1) or a portion of the relevant formula, and sends the result thereof to the higher-level storage apparatus 100. Also, according to row #6, it is clear that in a case where a double failure has occurred in RAID6 and the two data elements Dm and Dn have been lost, the data elements Dm and Dn can be rebuilt using two types of data—the operational results of the following (math 2) and (math 3).

$$(P + \Sigma D) \quad \text{[Math 2]}$$

$$(Q + \Sigma Ai \times Di) \quad \text{[Math 3]}$$

Since the method for rebuilding Dm and Dn based on these operational results is known, an explanation thereof will be omitted here. In accordance with this, in the high-speed data rebuild process, the processor 182 of the lower-level storage apparatus 180 operates on either the (math 2) and (math 3) or a portion of the formulas thereof, and sends the result thereof to the higher-level storage apparatus 100.

In Example 2, the processor 182 of the lower-level storage apparatus 180 creates either rebuilt data or partially rebuilt data from multiple data elements and/or parity in accordance with the rebuild data creation method shown in FIG. 20. In so doing, the processor 182 performs arithmetic processing by referencing the Galois computation coefficient table 250 stored in the memory 183 as needed.

Example 3

Example 3 will be explained next.

With regard to the processing executed in the data rebuild process (Step S42 of FIG. 13) in Example 1, Example 3 selects, from between the high-speed data rebuild process and the normal data rebuild process, the process estimated to take less time for data rebuild processing. Explanations of parts that are the same as Example 1 will be omitted.

Figure 21:
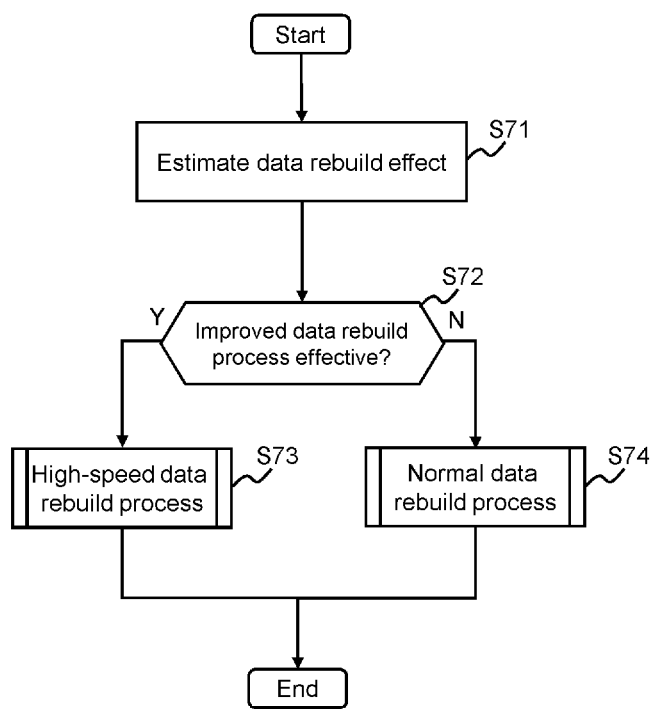
FIG. 21 is a flowchart of a rebuild processing selection process related to Example 3.

FIG. 21 is a flowchart of a rebuild process selection process related to Example 3.

The rebuild process selection process is executed in Step S42 of FIG. 13 of Example 1. The MP 121 estimates the data-rebuild effect, and determines which of the high-speed data rebuild process and the normal data rebuild process is more effective (Step S71). With regard to the estimate of the data-rebuild effect, for example, (1) the MP 121 computes the number of transfer-target stripe data elements (the rebuild-source stripe data element and the rebuild-destination stripe data element) in the rebuild-target row of stripes (referred to as DN) and the number of path groups in which the transfer-target stripe data elements are stored (referred to as PN). (2) The MP 121 computes the number of transfers (DN×2) by the BE controller 143 for the normal data rebuild process. (3) The MP 121 computes the number of transfers (number of transfers=(PN−1)×2×number of failed drives in row of stripes) by the BE controller 143 for the high-speed data rebuild process. (4) The MP 121 compares the number of transfers of the normal data rebuild process acquired in (2) to the number of transfers of the high-speed data rebuild process acquired in (3), and determines that the process with the fewer number of transfers is the effective data rebuild process. The data-rebuild effect estimate is not limited to this, and, for example, may be such that the normal data rebuild process is selected in accordance with the load status of the lower-level storage apparatus 180.

Next, the MP 121 determines whether or not the result of the estimate is that the high-speed data rebuild process is the most effective (Step S72), and in a case where the high-speed data rebuild process has been determined to be effective (Step S72: Y), executes the high-speed data rebuild process (FIG. 14) (Step S73) and, alternatively, in a case where the high-speed data rebuild process has been determined not to be effective (Step S72: N), executes the normal data rebuild process (FIG. 16) (Step S74).

By executing the rebuild process selection process, it is possible to execute either the high-speed data rebuild process or the normal data rebuild process by selecting the one, which is estimated to take less time for data rebuild processing.

For example, in a case where the virtual pool space 52 is a RAID6 (6D+2P) configuration, the following takes place when the rebuild process selection process is executed for a certain row of stripes in which data elements D1 and D2 are stored in path group 1, data elements D3 and D4 are stored in path group 2, P-parity is stored in path group 3, data element D5 is stored in path group 4, the storage apparatus storing data element D6 fails, and a storage apparatus of path group 3 serves as the rebuild-destination area for the data element D6.

Since the RAID group is the 6D2P configuration, and the Q-parity need not be used in this example, the MP 121 computes DM=6+2−1=7, and since the transfer-target stripe data elements (D1 through D4, P, and D5, which is to be rebuilt) are included in the four path groups 1 through 4, computes PN=4. The MP 121 computes the number of transfers by the BE controller 143 for the normal data rebuild process as being equal to DN×2=14. The MP 121 computes the number of transfers by the BE controller 143 for the high-speed data rebuild process as being equal to (PN−1)×2× the number of failed drives in the row of stripes (4−1)×2×1=6. According to the results, the number of transfers by the BE controller 143 for the high-speed data rebuild process is less than the number of transfers by the BE controller 143 for the normal data rebuild process, and as such, the MP 121 determines that the high-speed data rebuild process is more effective, and executes the high-speed data rebuild process.

Also, for example, in a case where the virtual pool space 52 is a RAID6 (3D+2P) configuration, the following takes place when the rebuild process selection process is executed for a certain row of stripes in which data element D1 is stored in path group 1, P-parity is stored in path group 2, Q-parity is stored in path group 4, the two storage apparatuses storing data elements D2 and D3 fail, a storage apparatus of path group 3 serves as the rebuild-destination area for the data element D2, and a storage apparatus of path group 4 serves as the rebuild-destination area for the data element D3.

Since the RAID group is the 3D2P configuration, the MP 121 computes DN=3+2=5, and since the transfer-target stripe data elements (D1, P, Q, and D2 and D3, which are to be rebuilt) are included in the four path groups 1 through 4, computes PN=4. The MP 121 computes the number of transfers by the BE controller 143 for the normal data rebuild process as being equal to DN×2=10. The MP 121 computes the number of transfers by the BE controller 143 for the high-speed data rebuild process as being equal to (PN−1)×2× the number of failed drives in the row of stripes (4−1)×2×2=12. According to the results, the number of transfers by the BE controller 143 for the normal data rebuild process is less than the number of transfers by the BE controller 143 for the high-speed data rebuild process, and as such, the MP 121 determines that the normal data rebuild process is more effective, and executes the normal data rebuild process.

Example 4

A computer system related to Example 4 will be explained next.

Example 4 executes high-speed data rebuild processing in the data rebuild process (Step S42 of FIG. 13) of Example 1, and performs normal data rebuild processing when the high-speed data rebuild process fails. Explanations of parts that are the same as Example 1 will be omitted.

Figure 22:
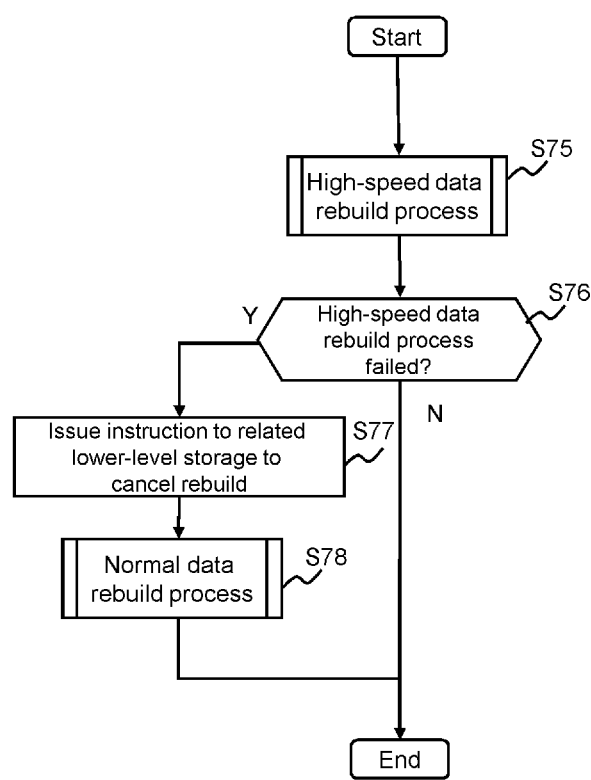
FIG. 22 is a flowchart of a data rebuild process related to Example 4.

FIG. 22 is a flowchart of a data rebuild process related to Example 4.

The MP 121 executes the high-speed data rebuild process (FIG. 14) (Step S75). Next, the MP 121 determines whether or not the high-speed data rebuild process has failed (Step S76), and in a case where the high-speed data rebuild process has not failed (Step S76: N), ends the data rebuild processing.

Alternatively, in a case where the high-speed data rebuild process has failed (Step S76: Y), the MP 121 reads a stripe data element in the high-speed data rebuild process, and issues a rebuild cancel order to the lower-level storage apparatus 180, which executes the process for writing the stripe data element (Step S77). The processor 182 of the lower-level storage apparatus 180, which receives the rebuild cancel order, releases the memory 183 buffer, which was reserved in the high-speed data rebuild process. Next, the MP 121 executes the normal data rebuild process (FIG. 16) (Step S78).

According to the computer system related to Example 4, it is possible to perform an appropriate data rebuild using the normal data rebuild process even in a case where the high-speed data rebuild process has failed.

Example 5

A computer system related to Example 5 will be explained next.

Example 5 couples multiple external storage apparatuses 40 to the higher-level storage apparatus 100, configures a RAID group from multiple external storage apparatuses 40, and uses the area of this RAID group as the storage area of a virtual pool space 52.

Figure 23:
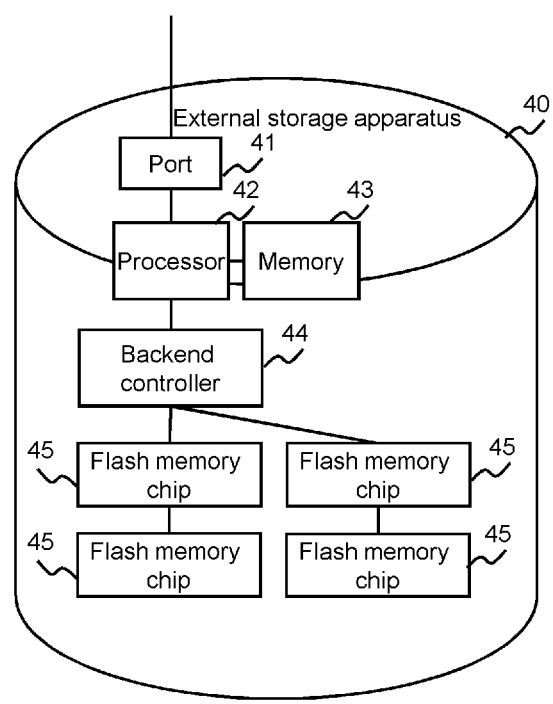
FIG. 23 is a block diagram of an external storage apparatus related to Example 5.

FIG. 23 is a block diagram of an external storage apparatus related to Example 5.

The external storage apparatus 40 comprises a port 41, a processor 42, a memory 43, a backend controller 44, and one or more flash memory chips 45.

The port 41 is an interface for carrying out communications with either the port 111 of the FEPK 110, or another external storage apparatus 40. The memory 43 stores a program and various types of information. The processor 42 executes a program stored in the memory 43, and performs various processing by using the information stored in the memory 43. In this example, the processor 42 executes processing corresponding to each type of command sent from the higher-level storage apparatus 100 via the port 111. The types of commands here are the same as the commands that the MP 121 sends to the lower-level storage apparatus 180 in Example 1, and the processor 42 executes the same processing as that of the processor 182 of the lower-level storage apparatus 180 with respect to these commands. The processor 42 also executes the same arithmetic processing as the parity operator 141. The backend controller 44 mediates the exchange of data with the flash memory chip 45. The flash memory chip 45, for example, may be a NAND-type flash memory chip, may be another type (for example, a NOR type) of flash memory, or may be a PRAM or a ReRAM. Alternatively, it may be a magnetic disk.

In the computer system related to Example 5, the external storage apparatus 40 performs the processing, which was performed by the lower-level storage apparatus 180 in Example 1, and the higher-level storage apparatus 100 performs by way of the FEPK 110 the processing, which had been done via the BEPK 140 in Example 1. In Example 5, for example, a group of multiple external storage apparatuses 40 coupled to the same port 111 are treated the same as an identical path group for lower-level storage apparatuses 180, and for the sake of convenience, will be referred to as a path group. Multiple external storage apparatuses 40, which are coupled to the same port 111, may be in different site, that is, multiple external storage apparatuses 40 are coupled via a switch which is in local site and an extender.

Figure 24:
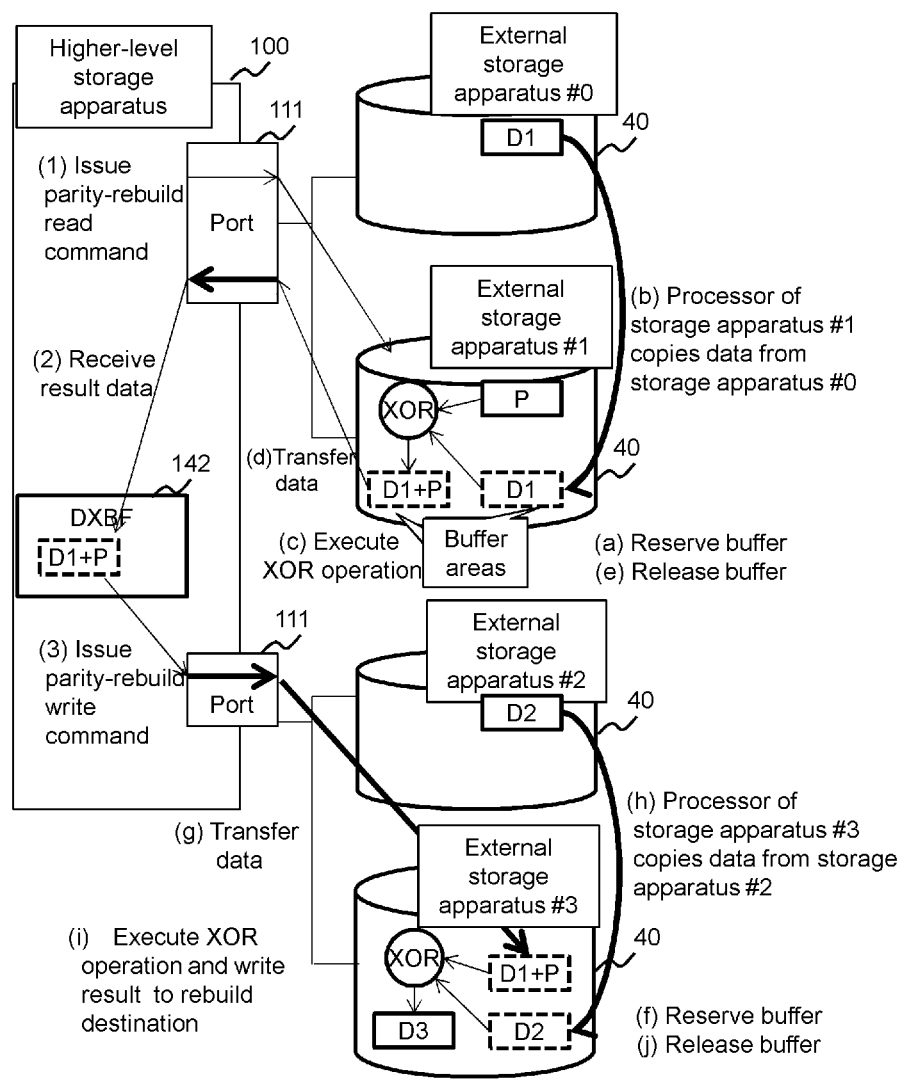
FIG. 24 is a diagram illustrating a high-speed data rebuild process related to Example 5.

FIG. 24 is a diagram illustrating a high-speed data rebuild process related to Example 5.

It is supposed here that multiple external storage apparatuses 40 comprise a RAID5 (3D+1P), a data element D1 is stored in an external storage apparatus #0, a P-parity is stored in an external storage apparatus #1, a data element D2 is stored in an external storage apparatus #2, and a data element D3 is stored in an external storage apparatus 40 not shown in the drawing. It is also supposed that the external storage apparatus #0 and the external storage apparatus #1 belong to the same path group, and that the external storage apparatus #2 and the external storage apparatus #3 belong to the same path group.

A high-speed data rebuild process in a case where the external storage apparatus 40 storing the data element D3 fails and the data element D3 is rebuilt in the external storage apparatus #3 will be explained here.

In the high-speed data rebuild process, the MP 121 issues a parity-rebuild read command via the port 111 of the FEPK 110 to the external storage apparatus #1 in the path group storing the data element D1 and P-parity in the same row of stripes as the data element D3 ((1) in the drawing).

In the external storage apparatus #1, upon receiving the parity-rebuild read command, the processor 42 starts the process conforming to the command, reserves a buffer in the memory 43 of the external storage apparatus #1 ((a) in the drawing), acquires the data element D1 from the external storage apparatus #0 and copies this data element D1 to the buffer ((b) in the drawing), executes an exclusive OR with respect to the data element D1 and the P-parity of the same row of stripes stored in the external storage apparatus #1, and sends the execution result (D1+P) to the higher-level storage apparatus 100 ((d) in the drawing). Thereafter, the processor 42 releases the buffer, which had been reserved in the memory 43 ((e) in the drawing).

In the higher-level storage apparatus 100, the MP 121 stores the data of the execution result (D1+P) sent from the external storage apparatus #1 in the transfer buffer 142. The execution result (D1+P), which is stored in the transfer buffer 142, is not transferred to the CM 131.

Next, the MP 121 issues a parity-rebuild write command via the port 111 to the rebuild-destination external storage apparatus #3 of a different path group from the path group to which the external storage apparatus #1 belongs ((3) in the drawing).

In the external storage apparatus #3, upon receiving the parity-rebuild write command, the processor 42 starts the process conforming to the command, reserves a buffer in the memory 43 of the external storage apparatus #3 ((f) in the drawing), and receives the execution result (D1+P) transferred from the transfer buffer 142 by the MP 121 ((g) in the drawing). Next, the processor 42 of the external storage apparatus #3 acquires the data element D2 of the same row of stripes as the data element D3 from the external storage apparatus #2, copies this data element D2 to the buffer ((h) in the drawing), executes an exclusive OR with respect to the execution result (D1+P) stored in the buffer and the data element D2, rebuilds the data element D3, and stores the data element D3 in the rebuild-destination area of the external storage apparatus #3 ((i) in the drawing).

According to the processing described above, data, which is sent to the transfer buffer 142 from a single path group is a single execution result, and it is possible to reduce the amount of data transferred between the external storage apparatus 40 and the FEPK 110. Also, the execution result, which is sent to the rebuild-destination external storage apparatus #3 from the FEPK 110, is the number of the transfer-source path groups (one in this example), making it possible to reduce the amount of data transferred between the external storage apparatus 40 and the FEPK 110.

A computer system related to Example 6 will be explained next.

Example 6

Example 6 stores partially rebuilt data computed based on a stripe data element of the same row of stripes in a path group to which one or more storage apparatuses (either lower-level storage apparatuses 180 or external storage apparatuses 40) belong, and subsequently uses this partially rebuilt data to rebuild a stripe data element. In a case where the throughput of the BE controller or the network for coupling thereto is lower than the throughput of the network interconnecting the lower-level storage apparatuses, whereas the processing for creating the partially rebuilt data is carried out at high-speed, the rebuild process via the higher-level storage apparatus could be delayed, dragging down the throughput and causing a drop in rebuild processing performance. In this case, the storage of partial data in free parcels of lower-level storage apparatuses in the respective path groups can make it possible to deal with the failure of yet another lower-level storage apparatus during rebuild execution, enabling reliability to be enhanced.

FIG. 25 is a diagram showing an example of a parcel mapping table related to Example 6.

The parcel mapping table 260 is for managing a physical parcel allocated to an extent. The parcel mapping table 260 manages an entry comprising the fields of a virtual pool space number 261, an extent number (#) 262, a drive offset number (#) 263, a physical drive number (#) 264, a physical parcel number (#) 265, a parcel status 266, and a rebuild data type 267. Each field is basically the same as the field of the same name shown in FIG. 7. The differences with the parcel mapping table 220 will be explained here.

In the parcel mapping table 260 of Example 6, multiple physical parcels can be correspondingly managed with respect to a drive offset in the same extent of the same virtual pool space. That is, multiple physical drive #s, physical parcel numbers, parcel statuses, and rebuild data types can be correspondingly stored with respect to the same drive offset of the same extent of the same virtual pool space.

In addition, "partially rebuilt data stored", which indicates that partially rebuilt data computed based on a portion of the stripe data elements in the same row of stripes is being stored, has been added anew as one of the parcel statuses stored in the parcel status 266.

In a case where the parcel status 266 in the same extent is "partially rebuilt data stored", information showing the data element and/or parity used for computing the partially rebuilt data is stored in the rebuild data type 267.

This drawing shows that for drive offset "3" of extent "0" in virtual pool space "2", rebuild-required data is stored in physical parcel "1" of physical drive "1", and partially rebuilt data is stored in physical parcel "4" of physical drive "2", and the partially rebuilt data is data element D1+P-parity.

Figure 26:
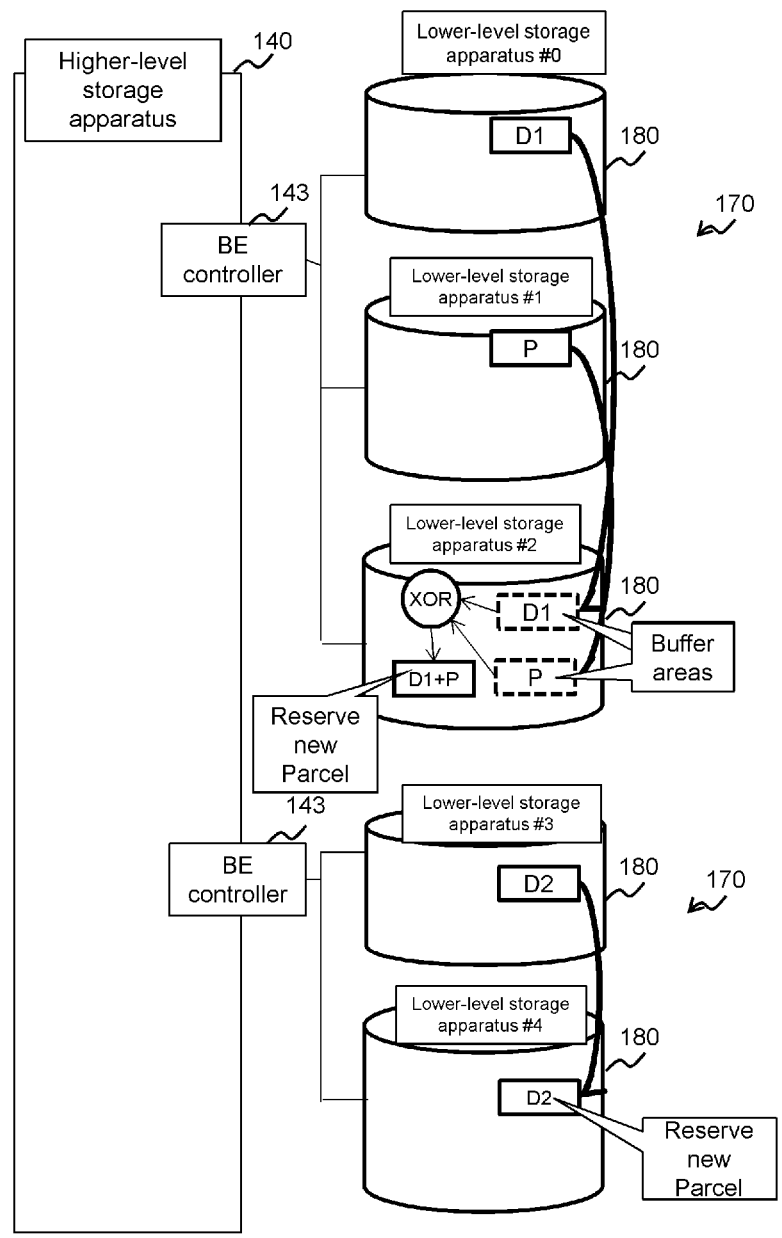
FIG. 26 is a diagram illustrating processing for creating partially rebuilt data in a rebuild process related to Example 6.

FIG. 26 is a diagram illustrating processing for creating partially rebuilt data in the rebuild process related to Example 6.

It is supposed here that multiple lower-level storage apparatuses 180 comprise a RAID5 (3D+1P), a data element D1 is stored in a lower-level storage apparatus #0, a P-parity is stored in a lower-level storage apparatus #1, a data element D2 is stored in a lower-level storage apparatus #3, and a data element D3 is stored in a lower-level storage apparatus 180 not shown in the drawing. It is supposed that this lower-level storage apparatus 180 has failed, and Example 6 shows rebuild processing in path groups in a state in which the data element D3 has been lost. It is also supposed that the lower-level storage apparatus #0, the lower-level storage apparatus #1, and a lower-level storage apparatus #2 belong to the same path group, and that the lower-level storage apparatus #3 and a lower-level storage apparatus #4 belong to the same path group.

The partially rebuilt data creation process shown in FIG. 26, for example, is executed at an arbitrary point in time. The MP 121 sends a command for creating partially rebuilt data in each path group to each of the lower-level storage apparatus #2 and the lower-level storage apparatus #4.

The lower-level storage apparatus #2 reserves a buffer in the memory 183 of the lower-level storage apparatus #2, acquires the data element D1 from the lower-level storage apparatus #0 of the same path group 170, and copies this data element D1 to the buffer, and, in addition, acquires the P-parity from the lower-level storage apparatus #1, copies this P-parity to the buffer, executes an exclusive OR with respect to the data element D1 and the P-parity, which have been copied to the buffer, stores an execution result (D1+P) in a newly reserved parcel of the lower-level storage apparatus #2, and returns a command response to the higher-level storage apparatus 100.

The MP 121 of the higher-level storage apparatus 100, which receives the command response, adds an entry corresponding to the row of stripes targeted for creating the partially rebuilt data, that is, an entry, which shares a virtual pool space number, an extent #, and a drive offset # in common, to the parcel mapping table 260, and in this entry, configures the parcel status 266 to "partially rebuilt data stored", stores a rebuild-destination physical drive # in the physical drive #264, stores a rebuild-destination physical parcel # in the physical parcel #265, and stores (D1+P), which shows the stripe data elements used in the creation of the partially rebuilt data, in the rebuild data type 267.

The lower-level storage apparatus #4, which belongs to a different path group 170, reserves a buffer in the memory 183 of the lower-level storage apparatus #4, acquires the data element D2 from the lower-level storage apparatus #3, stores this data element D2 in a newly reserved parcel of the lower-level storage apparatus #4, and returns a command response to the higher-level storage apparatus 100.

The MP 121 of the higher-level storage apparatus 100, which receives the command response, adds an entry corresponding to the row of stripes targeted for creating the partially rebuilt data, that is, an entry, which shares a virtual pool space number, an extent #, and a drive offset # in common, to the parcel mapping table 260, and in this entry, configures the parcel status 266 to "partially rebuilt data stored", stores a rebuild-destination physical drive # in the physical drive #264, stores a rebuild-destination physical parcel # in the physical parcel #265, and stores (D2), which shows the stripe data element used in the creation of the partially rebuilt data, in the rebuild data type 267.

Figure 27:
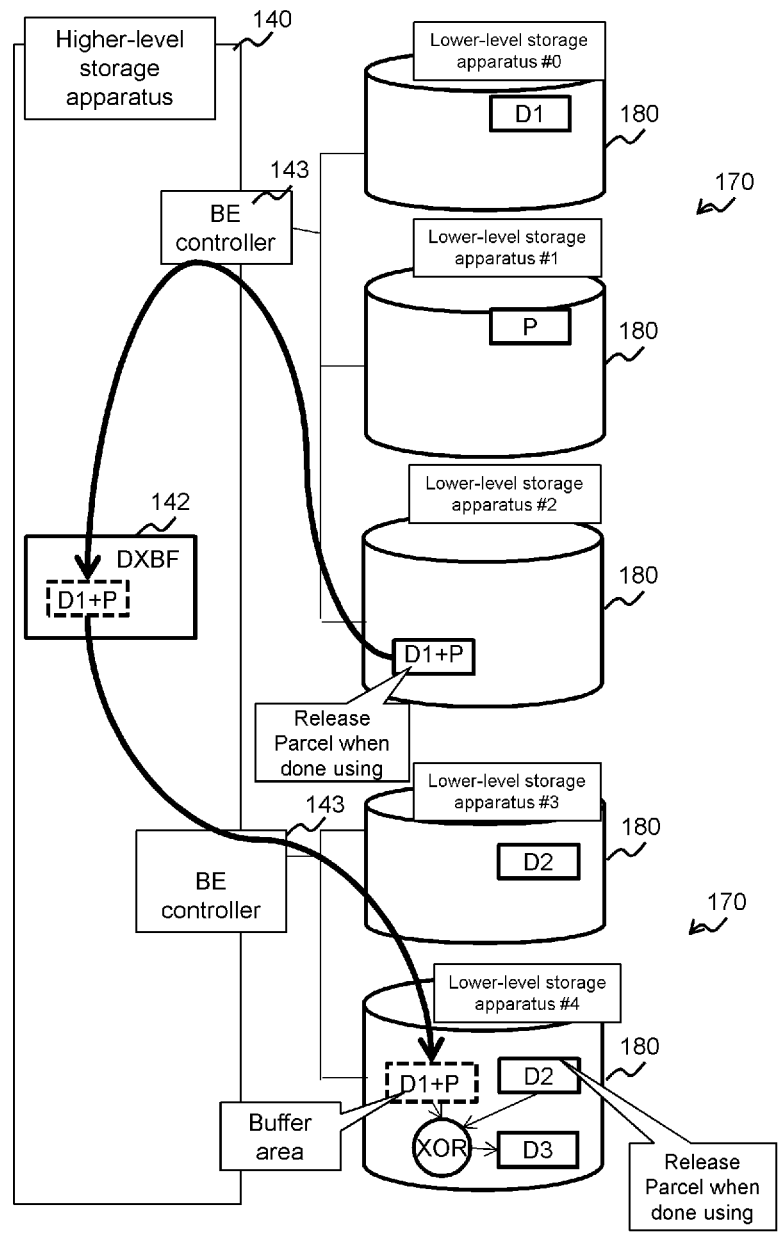
FIG. 27 is a diagram illustrating data rebuild processing in a rebuild process related to Example 6.

FIG. 27 is a diagram illustrating data rebuild processing in the rebuild process related to Example 6.

A rebuild process for data spanning path groups (continuation of FIG. 26) during data rebuild processing in a case where a lower-level storage apparatus 180 storing a data element D3 fails, and the data element D3 is rebuilt in a lower-level storage apparatus #4 will be explained here. This process is executed asynchronously to the rebuild processing for the data in the path groups of FIG. 26 based on the partially rebuilt data, which has been created.

The MP 121 references the parcel mapping table 260 and identifies a parcel storing partially rebuilt data needed to rebuild the data element D3, that is, a parcel of the lower-level storage apparatus #2. Next, the MP 121 stores a partially rebuilt data (D1+P) from the lower-level storage apparatus #2 in the transfer buffer 142 by way of the BE controller 143 of the BEPK 140. The partially rebuilt data (D1+P) stored in the transfer buffer 142 is not transferred to the CM 131. Subsequently, the processor 182 of the lower-level storage apparatus #2 releases the parcel, which had stored the execution result. In accordance with this, the MP 121 removes the entry corresponding to the parcel, which was released from the parcel mapping table 260.

Next, the MP 121 stores the partially rebuilt data (D1+P) in a buffer of the memory 183 of the lower-level storage apparatus #4 by way of the BE controller 143. The processor 182 of the lower-level storage apparatus #4 executes an exclusive OR with respect to the partially rebuilt data (D1+P) being stored in the buffer and the data element D2 being stored in the parcel, and stores the execution result thereof, that is, the data element D3 in the lower-level storage apparatus #4. Subsequently, the processor 182 of the lower-level storage apparatus #4 releases the parcel storing the data element D2. In accordance with this, the MP 121 removes the entry corresponding to the parcel, which was released from the parcel mapping table 260.

According to this data rebuild process, the higher-level storage apparatus 100, by acquiring partially rebuilt data from a lower-level storage apparatus 180 and sending this partially rebuilt data to the lower-level storage apparatus 180, which will perform the rebuild process, is able to store the rebuilt data in the lower-level storage apparatus 180. For this reason, the higher-level storage apparatus 100 can reduce the amount of communications with the lower-level storage apparatus 180. Also, since the partially rebuilt data in this data rebuild process is not stored in the CM 131 in the higher-level storage apparatus 100, the load on the CM 131 and the load on the internal network 150 can be held in check.

Figure 28:
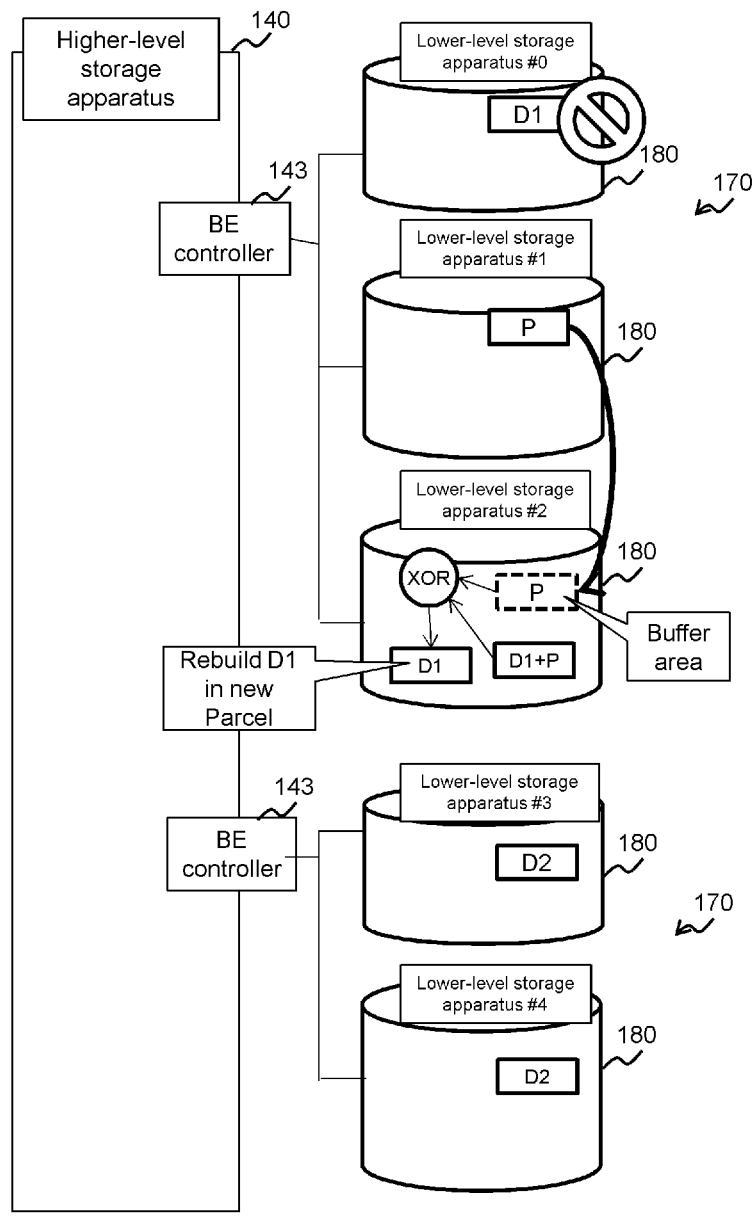
FIG. 28 is a first diagram illustrating a failure handling process during a rebuild related to Example 6.

FIG. 28 is a first diagram illustrating a failure handling process during a rebuild related to Example 6.

FIG. 28 shows a failure handling process in a case where a lower-level storage apparatus #0, which is storing a data element D1, fails in the state shown in FIG. 26, and the data element D1 is rebuilt in a lower-level storage apparatus #2.

The MP 121 references the parcel mapping table 260, identifies the lower-level storage apparatus #2, which is storing the partially rebuilt data computed using the data element D1, and sends a command for rebuilding the data element D1 to the relevant lower-level storage apparatus #2. The processor 182 of the lower-level storage apparatus #2 reserves a buffer in the memory 183, acquires a P-parity from the lower-level storage apparatus #1 of the same path group 170, copies this P-parity to the buffer, executes an exclusive OR with respect to the P-parity, which was copied to the buffer, and the partially rebuilt data (D1+P) being stored in the parcel, rebuilds the data element D1, and stores the data element D1 in a newly reserved parcel of the lower-level storage apparatus #2. According to this failure handling process, it is possible to use partially rebuilt data to rebuild a data element in a single path group, thereby enabling the data rebuild to be performed rapidly.

Figure 29:
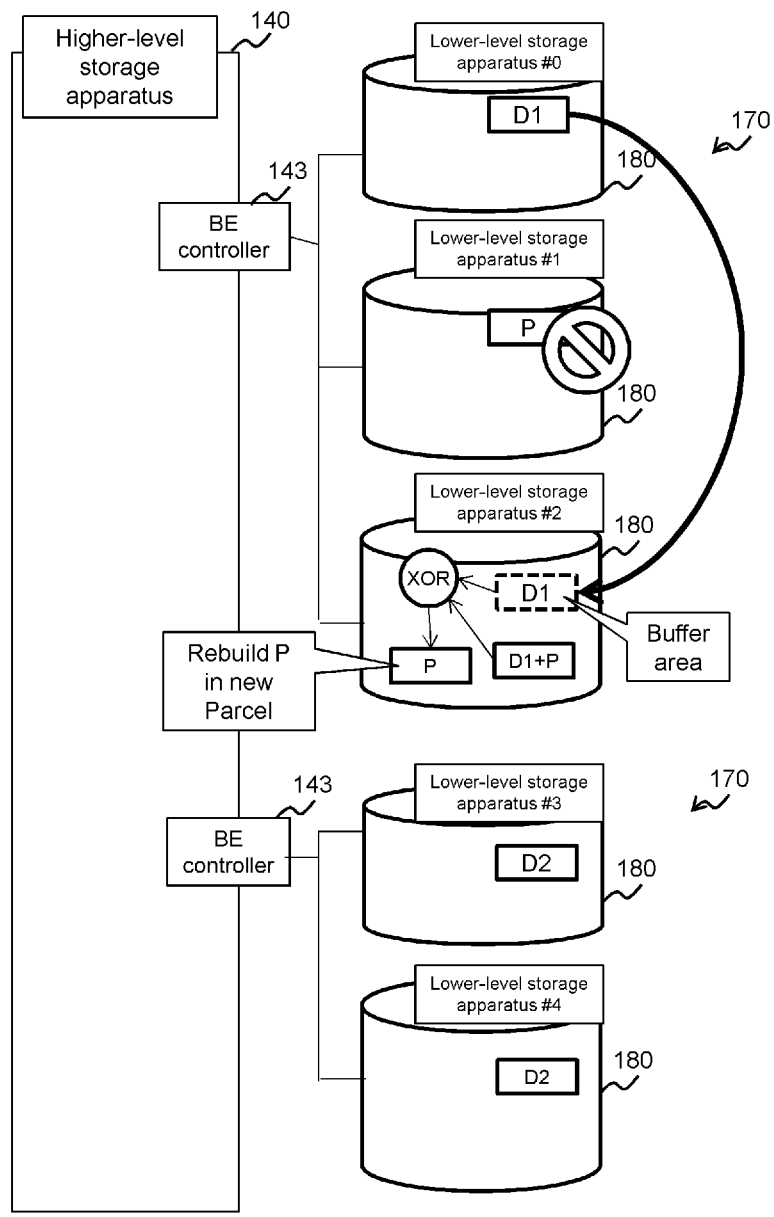
FIG. 29 is a second diagram illustrating a failure handling process during a rebuild related to Example 6.

FIG. 29 is a second diagram illustrating the failure handling process during a rebuild related to Example 6.

FIG. 29 shows a failure handling process in a case where a lower-level storage apparatus #1, which is storing a P-parity, fails in the state shown in FIG. 26, and the P-parity is rebuilt in a lower-level storage apparatus #2.

The MP 121 references the parcel mapping table 260, identifies the lower-level storage apparatus #2, which is storing the partially rebuilt data computed using the P-parity, and sends a command for rebuilding the P-parity to the relevant lower-level storage apparatus #2. The processor 182 of the lower-level storage apparatus #2 reserves a buffer in the memory 183, acquires the data element D1 from a lower-level storage apparatus #0 of the same path group 170, copies this data element D1 to the buffer, executes an exclusive OR with respect to the data element D1, which was copied to the buffer, and the partially rebuilt data (D1+P) being stored in the parcel, rebuilds the P-parity, and stores the P-parity in a newly reserved parcel of the lower-level storage apparatus #2. According to this failure handling process, it is possible to use partially rebuilt data to rebuild a parity in a single path group, thereby enabling the data rebuild to be performed rapidly.

Figure 30:
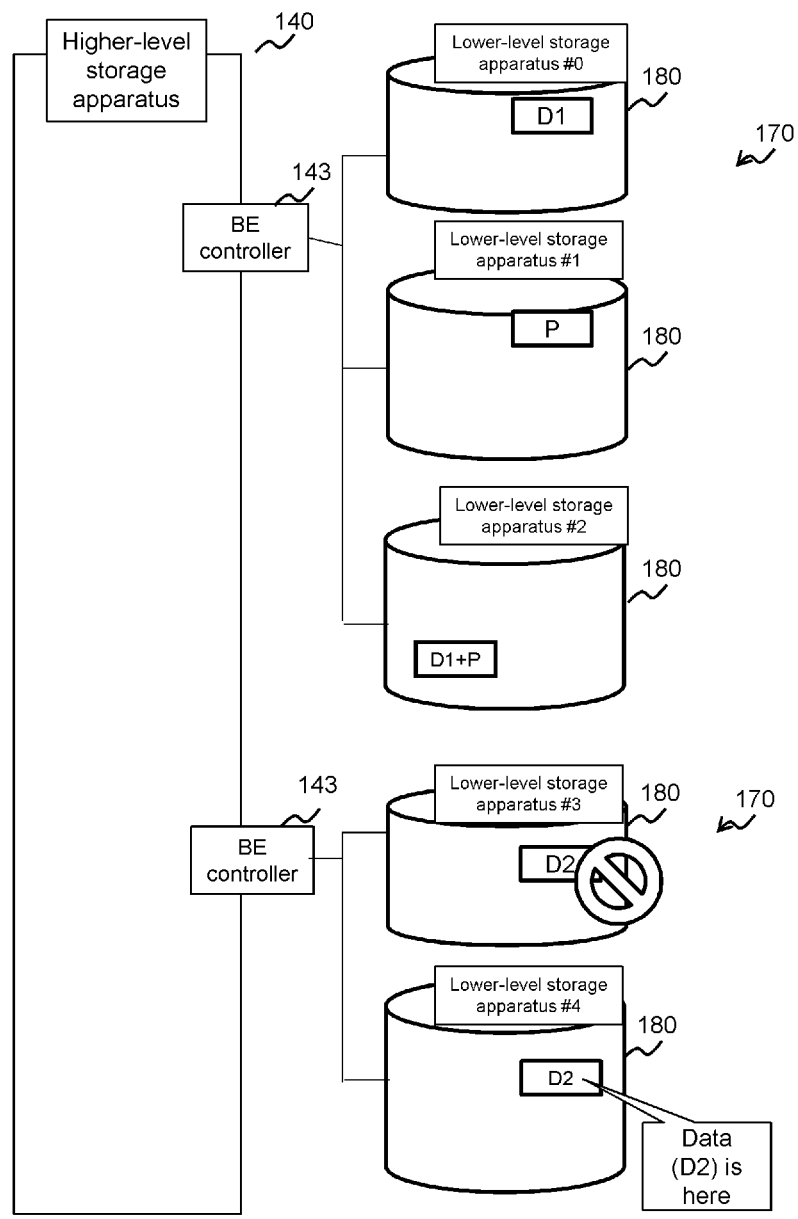
FIG. 30 is a third diagram illustrating a failure handling process during a rebuild related to Example 6.

FIG. 30 is a third diagram illustrating the failure handling process during a rebuild related to Example 6.

FIG. 30 shows the failure handling process in a case where a lower-level storage apparatus #3, which is storing a data element D2, has failed in the state shown in FIG. 26.

In this case, the partially rebuilt data in the relevant path group, in this example, the data element D2 is stored in a lower-level storage apparatus #4, which is in the same path group as the lower-level storage apparatus #3. Thus, the data element D2 can be acquired from the lower-level storage apparatus #4.

As described hereinabove, in a case where a rebuild process for data spanning path groups has not been completed, but the creation of partially rebuilt data for the path groups has been completed, a data rebuild can be executed even when a failure occurs in another lower-level storage apparatus, and, in addition, the data rebuild can be performed rapidly in accordance with reducing the amount of path group-spanning data that is transferred.

Example 7

A computer system related to Example 7 will be explained next.

Example 7 uses a readable lower-level storage apparatus 180 in a case where the lower-level storage apparatus 180, for example, is a storage medium, such as a flash memory device, which is capable of being read even when a failure has occurred and a write has become impossible. The shared memory 200 of Example 7, in addition to storing a rebuilt bitmap table 270 in the shared memory 200 of Example 1, also stores a parcel mapping table 280 instead of the parcel mapping table 210, and a drive status table 290 instead of the drive status table 230.

FIG. 31 is a diagram showing an example of a rebuilt bitmap table related to Example 7.

The rebuilt bitmap table 270 is for managing the rebuild status of data stored in a parcel. The rebuilt bitmap table 270 manages an entry comprising the fields of a physical drive #271, a physical parcel #272, and a rebuild bitmap 273.

The number of a lower-level storage apparatus 180 (a physical drive #) is stored in the physical drive #271. The number of a physical parcel (a physical parcel #) in the lower-level storage apparatus 180 corresponding to the physical drive # in the physical drive #271 is stored in the physical parcel #272. An aggregate of bits showing whether or not a rebuild has been done (a bitmap) corresponding to each sub-block in the physical parcel of the physical parcel #272 of the same entry is stored in the rebuild bitmap 273. In this example, in a case where a sub-block has been rebuilt, "1" is configured in the bit corresponding to the sub-block, and in a case where a sub-block has not been rebuilt, "0" is configured in the bit corresponding to the sub-block. This example manages whether or not rebuilding has been performed in units of sub-blocks, but the example is not limited to this, and, for example, may manage whether or not rebuilding has been performed having a larger unit (a slot, a piece of stripe data, a parcel, and so forth) as the unit.

FIG. 32 is a diagram showing an example of a parcel mapping table related to Example 7.

The parcel mapping table 280 is for managing a physical parcel allocated to an extent. The parcel mapping table 280 manages an entry comprising the fields of a virtual pool space number 281, an extent number (#) 282, a drive offset number (#) 283, a physical drive number (#) 284, a physical parcel number (#) 285, and a parcel status 286. Each field is basically the same as the field of the same name shown in FIG. 7. The differences with the parcel mapping table 220 will be explained here.

In the parcel mapping table 280, multiple physical parcels can be correspondingly managed with respect to a drive offset of the same extent in the same virtual pool space. That is, multiple physical drive #s, physical parcel numbers, and parcel statuses can be correspondingly stored with respect to the same drive offset of the same extent in the same virtual pool space.

In addition, "rebuilt data storage", which indicates a parcel in which rebuilt data is stored in the same row of stripes, has been added anew as one of the parcel statuses stored in the parcel status 286.

This drawing shows that for drive offset "3" of extent "0" in virtual pool space "2", rebuild-required data, that is, old data is stored in physical parcel "1" of physical drive "1", and rebuilt data is stored in physical parcel "4" of physical drive "2".

FIG. 33 is a diagram showing an example of a drive status table related to Example 7.

The drive status table 290 is for managing the status of a physical drive comprising a virtual pool space. The drive status table 290 manages an entry comprising the fields of a virtual pool space number 291, a physical drive number 292, a number of errors (Read) 293, a number of errors (Write) 294, and a status 295.

The number of a virtual pool space (a virtual pool space number) is stored in the virtual pool space number 291. The number (a physical drive number) of a physical drive comprising the virtual pool space corresponding to the virtual pool space number in the virtual pool space number 291 of the entry is stored in the physical drive number 292. A number of errors at the time of a Read (a number of read errors) in a lower-level storage apparatus 180 corresponding to the physical drive number in the physical drive number 292 is stored in the number of errors (Read) 293. A number of errors at the time of a Write (a number of write errors) in a lower-level storage apparatus 180 corresponding to the physical drive number in the physical drive number 292 is stored in the number of errors (Write) 294. The status of a physical drive (a lower-level storage apparatus 180) corresponding to the physical drive number in the physical drive number 292 of the entry is stored in the status 295. As the status of a physical drive, there can be configured "normal", which indicates that the physical drive is normal, "abnormal (inaccessible)", which indicates that it is not possible to read and write to the physical drive, and "abnormal (W not possible)", which indicates that it is only writing to the physical drive is not possible.

Figure 34:
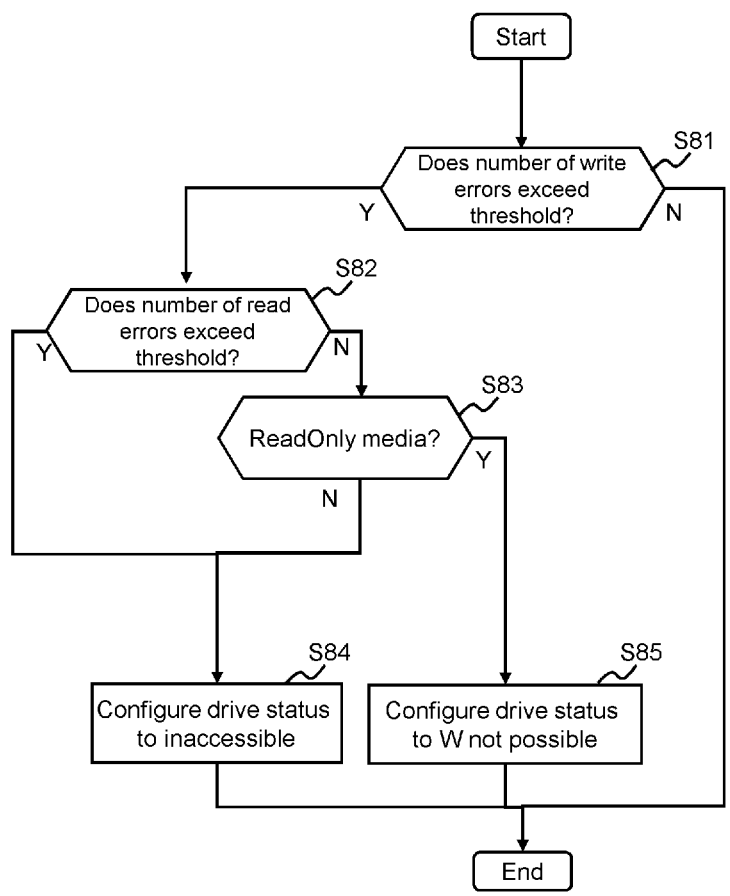
FIG. 34 is a flowchart of a failure detection process related to Example 7.

FIG. 34 is a flowchart of a failure detection process related to Example 7.

The failure detection process, for example, is executed at each prescribed time for the lower-level storage apparatus 180 of each physical drive number stored in the physical drive number 292 of the drive status table 290. The MP 121 references the entry corresponding to the processing-target lower-level storage apparatus 180 of the drive status table 290, and determines whether or not the number of write errors stored in the number of errors (Write) 294 of the relevant entry exceeds a prescribed write error-related threshold (Step S81). In a case where the result thereof is that the number of write errors does not exceed the prescribed write error-related threshold (Step S81: N), the MP 121 ends the failure detection processing.

The MP 121 determines whether or not the number of read errors of the number of errors (Read) 293 of the relevant entry exceeds a prescribed read error-related threshold (Step S82). The read error-related threshold is a larger value than the write error-related threshold here.

In a case where the result thereof is that the number of read errors exceeds the read error-related threshold (Step S82: Y), the MP 121 advances the processing to Step S84. Alternatively, in a case where the number of read errors does not exceed the read error-related threshold (Step S82: N), the MP 121 determines whether or not the target lower-level storage apparatus 180, for example, is a ReadOnly media, such as a flash memory, which can be read even when a write is not possible (Step S83).

In a case where the result of this determination is that target lower-level storage apparatus 180 is not a ReadOnly media (Step S83: N), the MP 121 advances the processing to Step S84, and, alternatively, in a case where the target lower-level storage apparatus 180 is a ReadOnly media (Step S83: Y), advances the processing to Step S85.

In Step S84, the MP 121 configures "abnormal (inaccessible)" in the status 295 of the entry of the target lower-level storage apparatus 180 of the drive status table 290.

In Step S85, the MP 121 configures "abnormal (W not possible)" in the status 295 of the entry of the target lower-level storage apparatus 180 of the drive status table 290.

In this failure detection processing, the type of failure in the lower-level storage apparatus 180 is detected based on the number of read errors and the number of write errors, but the present invention is not limited to this, and, for example, the MP 121 may issue a command to the lower-level storage apparatus 180 for querying the lower-level storage apparatus 180 about the type of failure.

Figure 35:
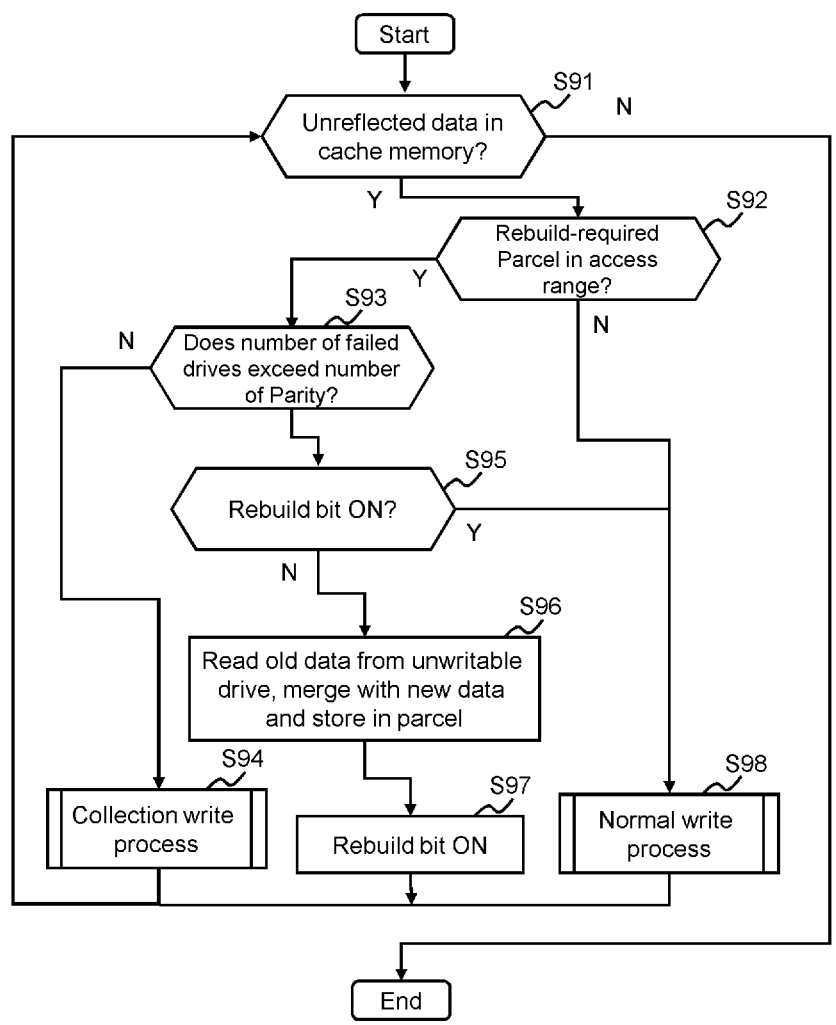
FIG. 35 is a diagram illustrating a write process related to Example 7.

FIG. 35 is a diagram illustrating a write process related to Example 7.

A write process, for example, may be executed synchronously with an I/O command (either a write command or a read command) from a host, or may be executed asynchronously with an I/O command from the host. The MP 121 determines whether or not data, which has not been reflected in a storage apparatus (either a lower-level storage apparatus 180 or an external storage apparatus 40), exists in the CM 131 (Step S91). In a case where the result thereof is that unreflected data does not exist in the CM 131 (Step S91: N), the MP 121 ends the write process.

Alternatively, in a case where unreflected data exists in the CM 131 (Step S91: Y), the MP 121 determines whether or not a rebuild-required parcel exists within the area for storing the unreflected data (Step S92). The processing for this determination is the same as that of Step S13 of FIG. 11.

In a case where the result thereof is that a rebuild-required parcel exists within the area for storing unreflected data (Step S92: Y), the MP 121 advances the processing to Step S93, and, alternatively, in a case where a parcel does not exist within the area for storing unreflected data (Step S92: N), the MP 121 executes a normal write process (Step S98), and moves the processing to Step S91.

In Step S93, the MP 121 determines whether or not the number of failed drives has exceeded the number of parities of the RAID group comprising the area for storing the relevant unreflected data. In a case where the result thereof is that the number of failed drives does not exceed the number of parities of the RAID group comprising the area for storing the relevant unreflected data (Step S93: N), the MP 121 executes a correction write process (Step S94). The correction write process is the same as Step S24 of FIG. 12.

Alternatively, in a case where the number of failed drives exceeds the number of parities of the RAID group comprising the area for storing the relevant unreflected data (Step S93:Y), the MP 121 references the rebuilt bitmap table 270 and determines whether or not the rebuild bit corresponding to the area for storing the unreflected data is ON ("1") (Step S95).

In a case where the result thereof is that the rebuild bit corresponding to the parcel area for storing the unreflected data is ON (Step S95: Y), the MP 121 executes a normal write process (Step S98) and moves the processing to Step S91.

Alternatively, in a case where the rebuild bit corresponding to the parcel area for storing the unreflected data is not ON (Step S95: N), the MP 121 reads old data in the area corresponding to the unreflected data from the lower-level storage apparatus 180 in the abnormal (W not possible) state, merges the relevant old data with the unreflected data (new data) in the CM 131 to create a rebuilt data, reserves a new parcel for storing rebuild data from non-failed drives to store the rebuild data in the parcel (Step S96), configures the rebuild bit corresponding to the parcel area for storing the unreflected data of the rebuild bitmap 273 in the rebuilt bitmap table 270 to ON (Step S97), and moves the processing to Step S91. In so doing, the addition to the parcel mapping table 280 of an entry showing the parcel in which the rebuild data is being stored makes it possible to execute a host I/O with respect to the rebuild data-storing parcel.

In the read process of Example 7, the MP 121, upon receiving a read request from the host 10, references the drive status table 290, and since a case in which the failure status of the lower-level storage apparatus 180 corresponding to the read request is abnormal (W not possible) signifies that the relevant lower-level storage apparatus 180 will appropriately perform a read, reads the data corresponding to the read request from the relevant lower-level storage apparatus 180 as usual.

According to the processing described above, even when there is an abnormal drive, which exceeds the redundancy, the processing of a host I/O can continue to be executed in a case where the abnormality is (W not possible). In this example, parcel mapping is managed, but the same method may be implemented for a virtual page.

Example 8

A computer system related to Example 8 will be explained next.

In a case where a RAID group comprising multiple lower-level storage apparatuses 180, for example, is configured as RAID6 so as to be able to perform a rebuild even when multiple (for example, two) lower-level storage apparatuses 180 have failed, that is, is configured having a redundancy of equal to or larger than two, and another lower-level storage apparatus 180 also fails, Example 8 rebuilds the data of a row of stripes, which is likely to be lost, on a priority basis. A configuration with redundancy of equal to or larger than two is not limited to RAID6, and, for example, may be a triple mirror configuration.

Figure 36:
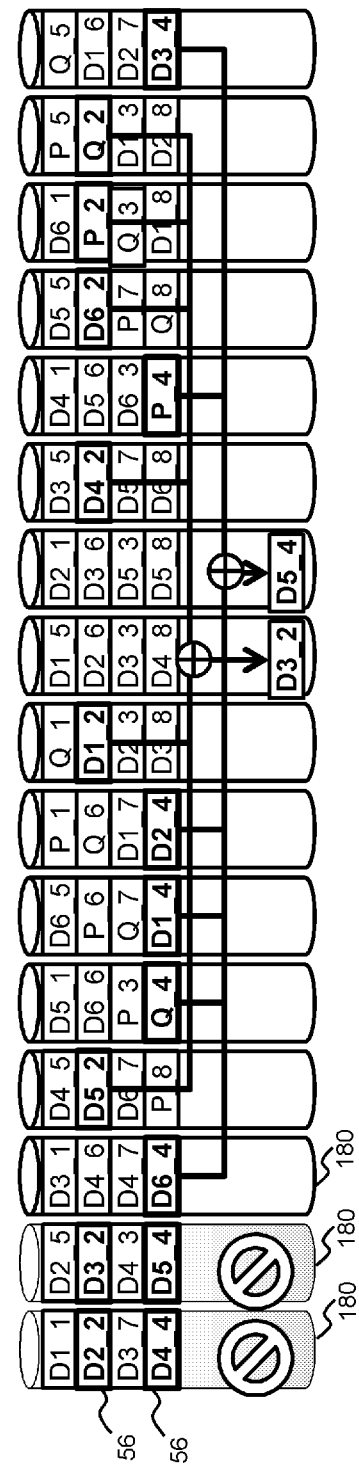
FIG. 36 is a diagram illustrating a priority rebuild related to Example 8.

FIG. 36 is a diagram illustrating a priority rebuild related to Example 8.

FIG. 36 shows an example in which the virtual pool space comprises 16 lower-level storage apparatuses 180, and the virtual pool space is a RAID6 with a 6D+2P configuration. In this drawing, reference signs, which have the numeral following a "_" in common, such as D1_1, D2_1, D3_1, D4_1, D5_1,1 D6_1, P_1, and Q_1, indicate data elements in the same data unit and parity, that is, that the data elements and parity are in the same row of stripes.

In a state where data elements and parity are being stored as shown in FIG. 36, the RAID6 configuration makes it possible to rebuild required data elements and parity even in a case where the two lower-level storage apparatuses 180 on the left side have failed. However, in a case where one more different lower-level storage apparatus 180 also fails, there exists a data element and/or parity (referred to as warning data), which is likely to be unable to be rebuilt. Specifically, a stripe data element, which belongs to a row of stripes in which two stripe data elements of the same row of stripes are stored in the failed lower-level storage apparatus 180, corresponds to this unrebuildable stripe data element. In this drawing, as two stripe data elements of the same row of stripes, which are stored in the failed lower-level storage apparatus 180, there are data element D2_2 and data element D3_2, and data element D4_4 and data element D5_4. Hereinafter, a parcel, which comprises warning data, will be called a warning parcel.

Consequently, in Example 8, a rebuild is performed by placing priority on the warning data, which will be unable to be rebuilt in a case where another lower-level storage apparatus 180 fails. For example, the data element D3_2 and the data element D5_4 shown in this drawing are rebuilt in another lower-level storage apparatus 180 on a priority basis. In accordance with this, a warning parcel can be rebuilt at high speed even when yet another lower-level storage apparatus 180 has failed, thereby increasingly the probability of being able to appropriately rebuild a data element in the same row of stripes as the data element D2_2. This probability is characterized in that the probability increases the larger the number of drives across which the row of stripes is distributed.

Figure 37:
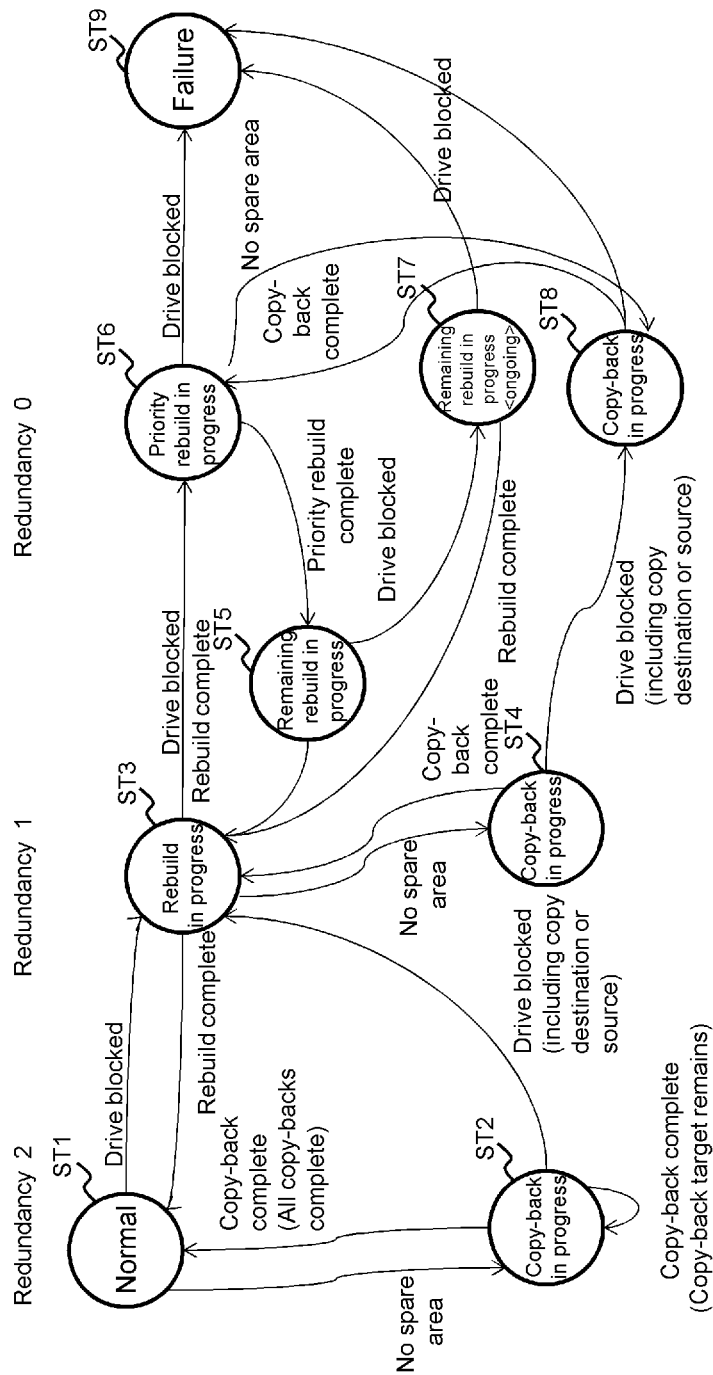
FIG. 37 is a diagram illustrating a status transition in a higher-level storage apparatus related to Example 8.

FIG. 37 is a diagram illustrating a status transition in a higher-level storage apparatus related to Example 8.

FIG. 37 shows a status transition in the higher-level storage apparatus 100, which manages a RAID group of RAID6 for each redundancy.

Since none of the lower-level storage apparatuses 180 (drives) have failed in the initial state, the higher-level storage apparatus 100 is in a normal (Normal) state ST1, and redundancy is two.

In the normal state ST1, when there is no spare area, which is an area for saving data, the higher-level storage apparatus 100 transitions to a copy-back-in-progress state ST2. The copy-back-in-progress state ST2 is a state in which processing is underway for returning data, which has been rebuilt in a spare area, to an area of a new drive from the spare area after a failed drive has been replaced with a new drive. The redundancy in the copy-back-in-progress state ST2 is two. In the normal state ST1, in a case where one drive is blocked, the higher-level storage apparatus 100 transitions to the rebuildin-progress state ST3. The rebuild-in-progress state ST3 is a state in which data (e.g., data elements) stored in a blocked drive is in the process of being rebuilt. The redundancy in the rebuild-in-progress state ST3 is one.

In the copy-back-in-progress state ST2, in a case where a copy-back for certain data has been completed, but data targeted for copy-back still exists, the higher-level storage apparatus 100 remains as-is in the copy-back-in-progress state ST2. In a case where the copy-back of all data has been completed in the copy-back-in-progress state ST2, the higher-level storage apparatus 100 transitions to the normal state ST1. Furthermore, in a case where one drive is blocked in the copy-back-in-progress state ST2, the higher-level storage apparatus 100 transitions to the rebuild-in-progress state ST3.

In the rebuild-in-progress state ST3, in a case where there is no spare area, which is an area for saving data, the higher-level storage apparatus 100 transitions to a copy-back-in-progress state ST4. The redundancy in the copy-back-in-progress state ST4 is one. In a case where the drive is blocked and warning parcel is appeared in the rebuild-in-progress state ST3, the higher-level storage apparatus 100 transitions to a priority rebuild-in-progress state ST6. The priority rebuild-in-progress state ST6 is a state in which processing is underway for rebuilding the warning data on a priority basis. The process for rebuilding the warning data on a priority basis will be called a priority rebuild here. The redundancy in the priority rebuild-in-progress state ST6 is zero.

In a case where the copy-back of all the data has been completed in the copy-back-in-progress state ST4, the higher-level storage apparatus 100 transitions to the rebuild-in-progress state ST3. In a case where a drive is blocked in the copy-back-in-progress state ST4, the higher-level storage apparatus 100 transitions to a copy-back-in-progress state ST8. The redundancy in the copy-back-in-progress state ST8 is zero.

In a case where a drive is blocked in the priority rebuild-in-progress state ST6, the higher-level storage apparatus 100 transitions to the failure (Failure) state ST9. The failure state ST9 is a state in which a data rebuild is not possible. In a case where there is no spare area, which is an area for saving data, in the priority rebuild-in-progress state ST6, the higher-level storage apparatus 100 transitions to the copy-back-in-progress state ST8. The redundancy in the copy-back-in-progress state ST8 is zero. In a case where a priority rebuild has been completed in the priority rebuild-in-progress state ST6, the higher-level storage apparatus 100 transitions to a remaining rebuild-in-progress state ST5. The remaining rebuild-in-progress state ST5 is the state in which parcel data other than the warning data is in the process of being rebuilt. The redundancy in the remaining rebuild-in-progress state ST5 is one.

In a case where a rebuild for data other than the warning data in the warning parcel has been completed in the remaining rebuild-in-progress state ST5, the higher-level storage apparatus 100 transitions to the rebuild-in-progress state ST3. In a case where a drive is blocked in the remaining rebuild-in-progress state ST5, the higher-level storage apparatus 100 transitions to a remaining rebuild-in-progress <ongoing> state ST7. The remaining rebuild-in-progress <ongoing> state ST7 is a state in which warning data, which has increased, is in the process of being rebuilt. The redundancy in the remaining rebuild-in-progress <ongoing> state ST7 is zero.

In a case where a drive is blocked in the remaining rebuild-in-progress <ongoing> state ST7, the higher-level storage apparatus 100 transitions to the failure state ST9. In a case where the rebuild of all the data in the warning parcel has been completed in the remaining rebuild-in-progress <ongoing> state ST7, the higher-level storage apparatus 100 transitions to the rebuild-in-progress state ST3.

In a case where the copy-back of all the data has been completed in the copy-back-in-progress state ST8, the higher-level storage apparatus 100 transitions to the priority rebuild-in-progress state ST6. In a case where one drive is blocked in the copy-back-in-progress state ST8, the higher-level storage apparatus 100 transitions to the failure state ST9.

FIG. 38 is a diagram showing an example of a stripe table related to Example 8.

A shared memory 200 of Example 8 further stores a stripe table 300 in the shared memory 200 of Example 1.

The stripe table 300 is for rapidly determining, based on a physical drive number, the state of a physical parcel in a lower-level storage apparatus 180 corresponding to this physical drive number, and is a reverse lookup table for the parcel mapping table 220. The stripe table 300 manages an entry comprising the fields of a physical drive #301, a physical parcel #302, a virtual pool space number 303, an extent #304, a drive offset #305, and a parcel status 306. Each field is basically the same as the field of the same name shown in FIG. 7.

Figure 39:
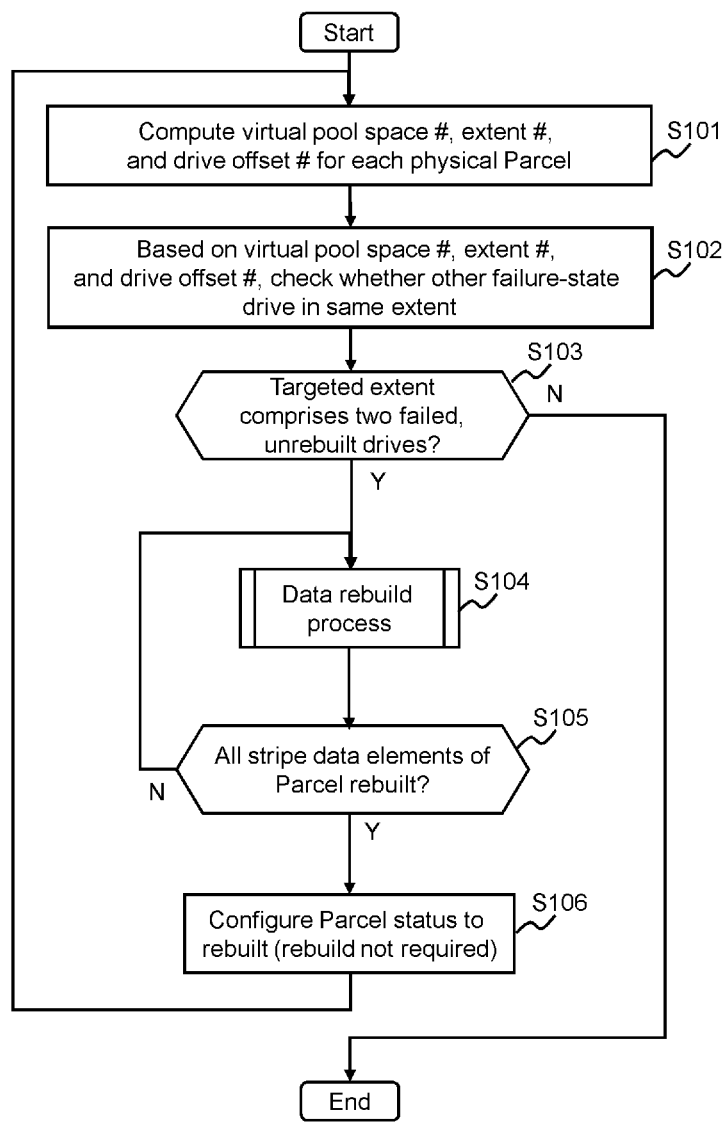
FIG. 39 is a flowchart of a priority rebuild process related to Example 8.

FIG. 39 is a flowchart of a priority rebuild process related to Example 8.

The priority rebuild process, for example, may be executed at each prescribed time, or may be executed when the MP 121 detects failures in two lower-level storage apparatuses 180. The MP 121 computes a virtual pool space #, an extent #, and a drive offset # corresponding to the relevant physical parcel for the entry of each physical parcel for which the parcel status 306 in the stripe table 300 is rebuild required (Step S101).

Next, the MP 121, based on the computed virtual pool space #, extent #, and drive offset #, checks whether or not the extent (target extent) corresponding thereto comprises another drive, which is in the failure state (rebuild required) (Step S102).

In a case where the result thereof is that two failed drives are included in the target extent, and, in addition, the data in these drives has not been rebuilt (S103: Y), the MP 121 executes a data rebuild process for rebuilding the unrebuilt data (Step S104), and advances the processing to Step S105, and, alternatively, in a case where either two or more failed drives are not included in the target extent, or the data is not unrebuilt (S103: N), ends the priority rebuild processing.

In Step S105, the MP 121 determines whether or not all the stripe data elements of the parcel to be rebuilt in the extent have been rebuilt (Step S105), and in a case where all the stripe data elements have not been rebuilt (Step S105: N), moves the processing to Step S104.

Alternatively, in a case where all the stripe data elements of the parcel to be rebuilt in the extent have been rebuilt (Step S105: Y), the MP 121 configures content (for example, a blank) indicating rebuild-not-required in the parcel status 226 of the process-target parcel entries in the parcel mapping table 220 and the stripe table 300 (Step S106), and moves the processing to Step S101.

Figure 40:
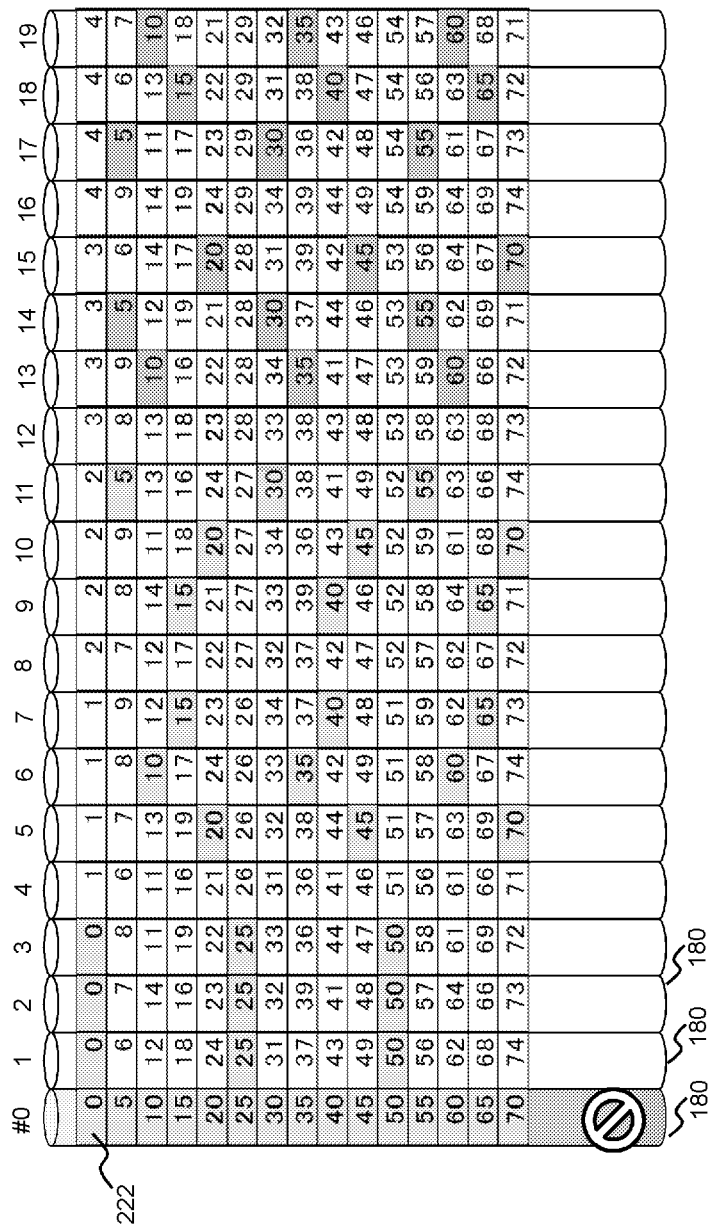
FIG. 40 is a diagram illustrating a data placement method related to Example 8.

FIG. 40 is a diagram illustrating a data placement method related to Example 8.

FIG. 40 shows an example in which the virtual pool space comprises 16 lower-level storage apparatuses 180, and the virtual pool space is a RAID6 with a 2D+2P configuration. In this drawing, reference signs, which have the numeral such as 1, and 2, indicate extent number 222, which same number box is parcel include in same extent. Data placement in FIG. 40 is decided by formula. More specifically, the extent number 222 corresponding to physical drive number (#) 224 and physical parcel number (#) 225 is calculated as following formula: ExtentID(d,p)=((floor(d/S)+p*(d MOD S)) MOD (D/S))+(D/S)*p, which "d" is physical drive number (#) 224, "p" is physical parcel number (#) 225, "D" is a number of whole drives (D=20 in FIG. 40), "S" is a number of parcels in an extent (S=4 in FIG. 40 with a 2D+2P configuration). The drives which include gray parcels in FIG. 40 are read accessed by rebuild process when lower-level storage apparatus 180 which physical drive number is 0 failed. Especially, if D/S is prime number, read accessed by rebuild process is finely distributed among the drives, parallel efficiency is increased, the rebuild processing time is shortened.

Figure 41:
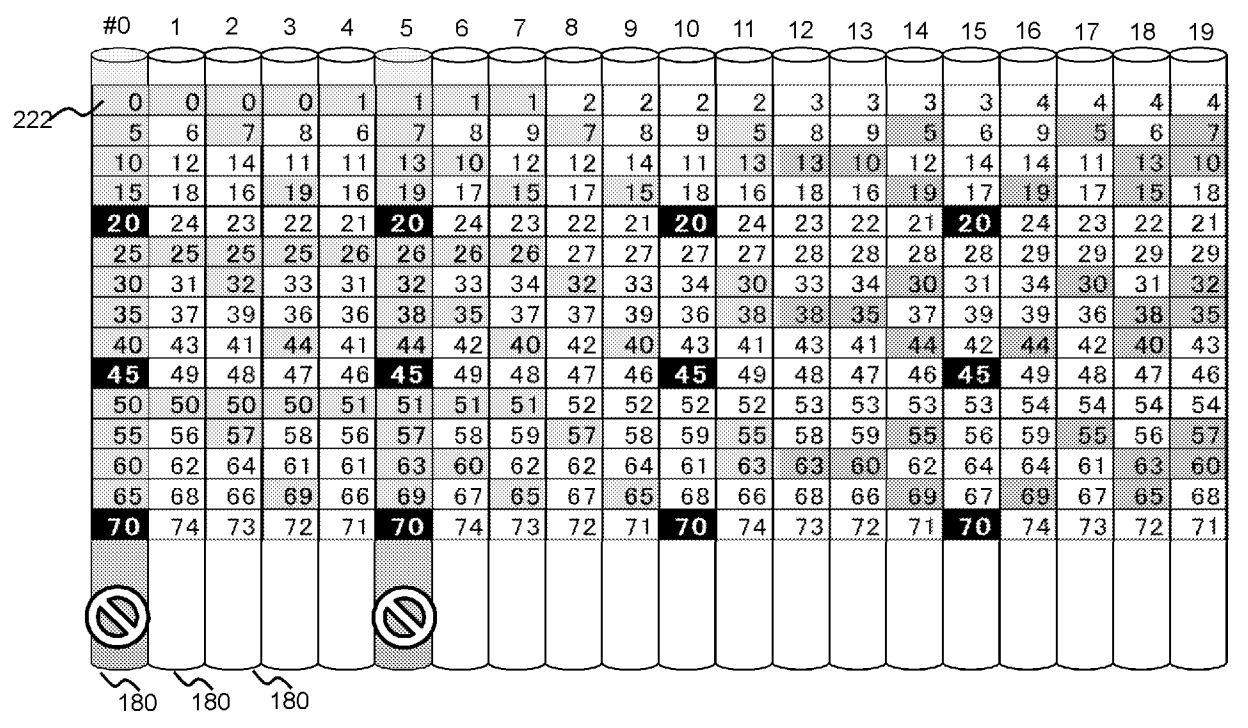

FIG. 41 is a diagram illustrating warning parcels position in a data placement method same as FIG. 40 related to Example 8.

FIG. 41 is indicate parcels that are read accessed by rebuild process when two lower-level storage apparatuses 180 which physical drive number is 0 and 5 failed. Black parcels (which included in extents which extent number is 20, 45, and 70) are warning parcels, but they are limited to include in the few drives (which drive number is 10 and 15). In this case, priority rebuild processing time is longer than FIG. 36 case, because load is not balancing by distributed among the many drives, but on the other hand, it can reduce the possibility of appearance of data loss parcel by third failure of the drive, so it can reduce data loss possibility in whole system.

Above formula is an example of efficient method, but the present invention is not limited to this example, it may also be implemented in shift some pattern of data layout based on the above formula by changing mapping of physical drive number (#) 224 and physical parcel number (#) 225, or limited lost data area to specific some drives when drives are failure by limiting the combination of drives which include parcel in extents by using parcel mapping table 220 described in FIG. 7.

According to the priority rebuild process, it is possible to rebuild on a priority basis data with a high likelihood of being lost, effectively enabling the prevention of data loss.

A number of examples have been explained hereinabove, but it goes without saying that the present invention is not limited to these examples, and that various changes can be made without departing from the gist thereof.

REFERENCE SIGNS LIST

100: Higher-level storage apparatus, 121: Microprocessor (MP), 142: Transfer buffer, 180: Lower-level storage apparatus, 182: Processor

The invention claimed is:

1. A storage system, comprising:
   an interface device coupled to multiple storage apparatuses, each of which including a plurality of stripes composing multiple stripe rows which are rows of stripes; and
   a first control device coupled to the interface device,
   wherein each of the stripe rows is configured to store multiple data elements and at least one redundancy code which, when up to a predetermined allowable number of data elements in the stripe row are stored in the stripes of the storage apparatus in fail, is used to rebuild the data elements,
   wherein a total number of the multiple storage apparatuses is larger than a number of the storage apparatuses including the stripes composing one of the stripe rows, and
   wherein the first control device is configured to:
   detect, from among the multiple stripe rows, at least two stripe rows having stripe data elements up to a prescribed allowable number that are stored in stripes in fail which are stripes in the storage apparatuses in fail; and
   rebuild, in parallel, the stripe data elements of the detected at least two stripe rows,
   wherein at least one of the data elements stored in stripes in fail of the detected stripe rows having larger number of stripes in fail is rebuilt prior to the data elements stored in the other detected stripe rows.

2. The storage system according to claim 1, wherein each of the multiple storage apparatuses is a storage media.

3. The storage system according to claim 2, wherein the multiple storage apparatuses are two or more Hard Disk Drives (HDDs) and/or two or more Solid State Devices (SSDs).

4. The storage system according to claim 1, further comprising a cache memory,
   wherein the interface device comprises a buffer, and a second control device,
   wherein the first control device is configured to acquire rebuild data required for rebuilding a prescribed rebuild-target stripe data element from one or more of the storage apparatuses, and store the rebuild data in the buffer, and
   wherein the first control device is configured to either
   (A) send the rebuild data stored in the buffer to any of the storage apparatuses, and cause the storage apparatus to rebuild the rebuild-target stripe data element, or
   (B) rebuild the rebuild-target stripe data element in the second control device based on the rebuild data stored in the buffer, and store the rebuilt stripe data element in any of the storage apparatuses.

5. The storage system according to claim 4,
   wherein the multiple storage apparatuses are divided into multiple groups,
   wherein the storage apparatuses belonging to the same group are able to communicate with one another, and
   wherein the first control device is configured to:
   (C) cause any storage apparatus belonging to one or more first groups which belongs to the storage apparatuses storing one or more stripe data elements of the same stripe row as the rebuild-target stripe data element, to collect one or more stripe data elements of the same stripe row as the rebuild-target stripe data element, and to create rebuild data based on the collected one or more stripe data elements.

6. The storage system according to claim 5, wherein the first control device is configured to cause the storage apparatuses storing one or more stripe data elements of the same stripe row as the rebuild-target stripe data element of the first group to execute the (C).

7. The storage system according to claim 4,
   wherein the first control device is configured to:
   estimate which of the (A) processing or the processing for rebuilding the rebuild-target stripe data element is more efficient, and
   control the rebuild processing of the rebuild-target stripe data element based on an estimation result.

8. The storage system according to claim 4,
   wherein the first storage device is configured to:
   execute the (A) processing, and
   in a case where the rebuild-target stripe data element cannot be rebuild in the (A) processing, execute processing for rebuilding the rebuild-target stripe data element.

9. The storage system according to claim 1,
wherein the multiple storage apparatuses are divided into multiple groups,
wherein the storage apparatuses belonging to the same group are able to communicate with one another,
wherein the multiple groups comprise one or more first groups which belongs to the storage apparatuses storing one or more stripe data elements of the same stripe row as the rebuild-target stripe data element, and
wherein the first control device is configured to:
send the rebuild data to a storage apparatus of a second group, which differs from the first group; and
(D) cause any first storage apparatus, which belongs to the second group, to rebuild the rebuild-target stripe data element based on the rebuild data, and to store the rebuilt stripe data element in a rebuild-destination storage apparatus belonging to the second group.

10. The storage system according to claim 9, wherein the first control device is configured to cause the storage apparatus which belongs to the second group, which is the rebuild destination of the rebuild-target stripe data element, to execute the (D).

11. The storage system according to claim 1, further comprising the storage apparatuses.

12. The storage system according to claim 1,
wherein the multiple storage apparatuses are divided into multiple groups,
wherein the storage apparatuses belonging to the same group are able to communicate with one another,
wherein at least one of the storage apparatuses of at least one of the groups is configured to:
collect one or more strip data elements of the same stripe row stored in the storage apparatus of the group,
create rebuild data based on the collected one or more stripe data elements, and
store the rebuild data in any storage apparatus of the group, and
wherein any storage apparatus of the group is configured to use the rebuild data to rebuild any of the stripe data elements of the row of stripes stored in the storage apparatus of the group.

13. The storage system according to claim 1,
wherein each of the storage apparatuses is a storage media, which enables a data read even in a case where a data write is not possible, and
wherein the first control device is configured to:
when a stripe data element stored in the storage media is to be read subsequent to a data write to the storage media having become impossible, read the read-target stripe data element from the storage media; and
when a new stripe data element corresponding to the stripe data element stored in the storage media is to be written, merge the stripe data element that has been read and the new stripe data element and store these merged elements in an area of a different storage apparatus, which is to be the rebuild destination of the stripe data element.

14. The storage system according to claim 1,
wherein at least one of data elements stored in the detected stripe row having prescribed allowable number of stripes in fail is rebuilt prior to data elements stored in the other detected stripe rows.

15. A data management method comprising:
detecting, from among multiple stripe rows, at least two stripe rows having stripe data elements up to a prescribed allowable number that are stored in stripes in fail which are stripes in storage apparatuses in fail of multiple storage apparatuses, each of the which including a plurality of stripes composing multiple stripe rows which are rows of stripes; and
each of the stripe rows being configured to store multiple data elements and at least one redundancy code which, when up to a predetermined allowable number of the data elements in the stripe row are stored in stripes in the storage apparatus in fail, is used to rebuild the data elements,
a total number of the multiple storage apparatuses being larger than a number of the storage apparatuses which includes the stripes composing one of the stripe rows,
rebuilding, in parallel, the stripe data elements of the detected at least two stripe rows,
wherein at least one of data elements stored in stripes in fail of the detected stripe rows having larger number of stripes in fail is rebuilt prior to data elements stored in the other detected stripe rows.

* * * * *